United States Patent
Seo et al.

(10) Patent No.: US 10,197,810 B2
(45) Date of Patent: Feb. 5, 2019

(54) IMAGE DISPLAY APPARATUS

(71) Applicant: SAMSUNG ELECTRONICS CO., LTD., Suwon-si (KR)

(72) Inventors: Wontaek Seo, Yongin-si (KR); Geeyoung Sung, Daegu (KR); Hongseok Lee, Seoul (KR); Yuntae Kim, Yongin-si (KR); Juwon Seo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/720,599

(22) Filed: Sep. 29, 2017

(65) Prior Publication Data
US 2018/0210222 A1   Jul. 26, 2018

(30) Foreign Application Priority Data
Jan. 23, 2017   (KR) .................. 10-2017-0010683

(51) Int. Cl.
*G02B 27/28*   (2006.01)
*G02B 27/01*   (2006.01)
(Continued)

(52) U.S. Cl.
CPC ............. *G02B 27/286* (2013.01); *G02B 3/10* (2013.01); *G02B 5/3016* (2013.01);
(Continued)

(58) Field of Classification Search
CPC ...................................................... G06T 19/06
(Continued)

(56) References Cited

U.S. PATENT DOCUMENTS 9,989,774 B1 *   6/2018   Sahlsten ............ G02B 27/0176
2015/0378074 A1   12/2015  Kollin et al.
(Continued)

FOREIGN PATENT DOCUMENTS

EP   0351967 A2   1/1900
EP   0308705 A2   3/1989
(Continued)

OTHER PUBLICATIONS

Tabiryan, Nelson V. et al. "Thin waveplate lenses: new generation in optics", Visual Communications and Image Processing; Jan. 20, 2004-Jan. 20, 2004; San Jose, vol. 9565, Oct. 8, 2015 (Oct. 8, 2015), pp. 956512-1-956512-9, XP060059563.
(Continued)

*Primary Examiner* — William C Dowling
(74) *Attorney, Agent, or Firm* — Sughrue Mion, PLLC

(57) ABSTRACT

Provided are display apparatuses and electronic apparatuses that include the display apparatuses. The display apparatus may include an optical system that transfers a first image and a second image to an ocular organ of a user. The optical system may include at least two polarization-dependent lenses. Each of the two polarization-dependent lenses may have a focal length that varies based on a polarization state of incident light. The two polarization-dependent lenses may have optically different characteristics with respect to the first and second images. The display apparatus may further include at least one wave plate and/or at least one polarizer provided between the two polarization-dependent lenses or outside thereof.

36 Claims, 20 Drawing Sheets

(51) Int. Cl.
  *G02B 5/30* (2006.01)
  *G06T 19/00* (2011.01)
  *G02B 3/10* (2006.01)
  *G02B 27/14* (2006.01)
(52) U.S. Cl.
  CPC ....... *G02B 5/3025* (2013.01); *G02B 27/0172* (2013.01); *G06T 19/006* (2013.01); *G02B 27/144* (2013.01)
(58) Field of Classification Search
  USPC ...................................... 353/8, 20; 359/630
  See application file for complete search history.

(56) References Cited

U.S. PATENT DOCUMENTS

| | | | |
|---|---|---|---|
| 2016/0011353 A1 | 1/2016 | Escuti et al. | |
| 2017/0078652 A1 | 3/2017 | Hua et al. | |
| 2017/0269366 A1* | 9/2017 | Lee | G02B 27/0172 |
| 2018/0107000 A1* | 4/2018 | Sung | G02B 3/10 |
| 2018/0122143 A1* | 5/2018 | Ellwood, Jr. | G02B 27/01 |
| 2018/0217375 A1* | 8/2018 | Tsang | G02B 27/0103 |
| 2018/0217429 A1* | 8/2018 | Busch | G02F 1/1395 |

FOREIGN PATENT DOCUMENTS

| | | |
|---|---|---|
| JP | 2000-249975 A | 9/2000 |
| JP | 3413885 B2 | 6/2003 |
| KR | 10-2016-0134714 A | 11/2016 |
| WO | 2016092285 A1 | 6/2016 |

OTHER PUBLICATIONS

Communication dated Jun. 22, 2018, issued by the European Patent Office in counterpart European Patent Application No. 17207056.7.

* cited by examiner

< COMPARATIVE EXAMPLE >

< EMBODIMENT >

IMAGE DISPLAY APPARATUS

CROSS-REFERENCE TO RELATED APPLICATION

This application claims priority from Korean Patent Application No. 10-2017-0010683, filed on Jan. 23, 2017 in the Korean Intellectual Property Office, the disclosure of which is incorporated herein by reference in its entirety.

BACKGROUND

1. Field

Example embodiments relate to display apparatuses, and more particularly, to multi-image display apparatuses and see-through type display apparatuses.

2. Description of the Related Art

Recently, as electronic apparatuses and display apparatuses capable of implementing virtual reality (VR) have been developed, interest in such apparatuses has increased. As a next step of VR, technologies and methods to implement augmented reality (AR) and mixed reality (MR) have been researched.

Unlike VR that is based on a complete virtual world, AR is a display technology that shows the real world and overlapped (combined) virtual objects and/or information that relates thereto, thereby further increasing an effect of reality. While VR is limitedly applied only to fields such as games or virtual experience, AR is advantageous in that it may be applied to a variety of reality environments. In particular, AR is attracting attention as a next-generation display technology suitable for a ubiquitous environment or an Internet of things (IoT) environment. AR may be an example of MR in that it shows a mixture of the real world and additional information (virtual world).

SUMMARY

One or more example embodiments provide display apparatuses (i.e., multi-image display apparatuses and see-through type display apparatuses) which may be applied to implementations of augmented reality (AR) or mixed reality (MR).

One or more example embodiments also provide display apparatuses (i.e., multi-image display apparatuses and see-through type display apparatuses) having superior performance.

One or more example embodiments also provide display apparatuses (i.e., multi-image display apparatuses and see-through type display apparatuses) which are advantageous in securing a wide angle of view.

One or more example embodiments also provide display apparatuses (i.e., multi-image display apparatuses and see-through type display apparatuses) which may prevent or reduce chromatic dispersion/chromatic aberration problems.

One or more example embodiments also provide display apparatuses (i.e., multi-image display apparatuses and see-through type display apparatuses) having a compact configuration.

One or more example embodiments also provide electronic apparatuses including the display apparatuses.

Additional aspects will be set forth in part in the description which follows and, in part, will be apparent from the description, or may be learned by practice of the presented example embodiments.

According to an aspect of an example embodiment, a multi-image display apparatus includes an image generator configured to generate a first image, and a multi-image transmitting optical system configured to transfer the first image to an ocular organ of a user via a first path and to transfer a second image that is different from the first image to the ocular organ of the user via a second path that is different from the first path, wherein the multi-image transmitting optical system comprises at least two polarization-dependent lenses, each of which has a respective focal length that varies based on a polarization state of incident light, and a combination of the at least two polarization-dependent lenses has first optical characteristics with respect to the first image and second optical characteristics that are different from the first optical characteristics with respect to the second image.

A combination of the at least two polarization-dependent lenses may be configured to reinforce a refractive power with respect to the first image and to offset the refractive power with respect to the second image.

A combination of the at least two polarization-dependent lens may be configured to have a positive (+) focal length with respect to the first image and to have an infinite or substantially infinite focal length with respect to the second image.

The at least two polarization-dependent lens may include first and second polarization-dependent lenses, light that corresponds to the first image may pass through each of the first and second polarization-dependent lenses, and each of the first and second polarization-dependent lenses may have a positive (+) focal length with respect to the light that corresponds to the first image.

The at least two polarization-dependent lenses may include first and second polarization-dependent lenses, light that corresponds to the first image twice may pass one of the first and second polarization-dependent lenses, and the lens, through which the light that corresponds to the first image passes twice, may have a positive (+) focal length with respect to the light of the first image during each of a first pass and a second pass.

The at least two polarization-dependent lenses may include first and second polarization-dependent lenses, light that corresponds to the second image may pass through each of the first and second polarization-dependent lenses, and one of the first and second polarization-dependent lens may have a positive (+) focal length with respect to the light that corresponds to the second image, and the other of the first and second polarization-dependent lens may have a negative (−) focal length with respect to the light that corresponds to the second image.

Each of the at least two polarization-dependent lenses may be a geometric phase lens.

The multi-image transmitting optical system may be a see-through type optical system, and the second image may be an external image that is visible to the user through the multi-image transmitting optical system.

The multi-image transmitting optical system may include a multipath optical member, the at least two polarization-dependent lenses arranged between the multipath optical member and the ocular organ of the user, and at least one polarizer and/or at least one wave plate arranged between two from among the at least two polarization-dependent lenses or outside the at least two polarization-dependent lenses.

The multi-image transmitting optical system may include a first polarization-dependent lens arranged between the multipath optical member and the ocular organ, a second polarization-dependent lens arranged between the first polarization-dependent lens and the multipath optical member, a first linear polarizer arranged between the first and second polarization-dependent lenses, and a first quarter-wave plate (QWP) arranged between the first polarization-dependent lens and the first linear polarizer.

The multipath optical member may include a polarization beam splitter (PBS), and the multi-image transmitting optical system may further include a second QWP that is arranged between the second polarization-dependent lens and the multipath optical member.

The multipath optical member may include a beam splitter or a transflective film, and the multi-image transmitting optical system may further include a second QWP and a second linear polarizer that are sequentially arranged at a side of an incident surface of the multipath optical member.

The multipath optical member may include a beam splitter or a transflective film, and the multi-image transmitting optical system may further include a second QWP that is arranged between the second polarization-dependent lens and the multipath optical member, a second linear polarizer arranged at a side of a first incident surface of the multipath optical member, and a third linear polarizer arranged at a side of a second incident surface of the multipath optical member.

Each of the first polarization-dependent lens and the second polarization-dependent lens may have an optically same directionality.

The multi-image transmitting optical system may include first and second polarization-dependent lenses sequentially arranged to face the ocular organ, a half mirror arranged between the first and second polarization-dependent lenses, and at least one polarizer and/or at least one wave plate arranged between the half mirror and the first and second polarization-dependent lenses or outside the half mirror and the first and second polarization-dependent lenses.

The multi-image transmitting optical system may include a first quarter-wave plate (QWP) arranged between the first polarization-dependent lens and the half mirror, a second QWP arranged between the half mirror and the second polarization-dependent lens, a first linear polarizer spaced apart from the second polarization-dependent lens, and a third QWP arranged between the second polarization-dependent lens and the first linear polarizer.

The multi-image transmitting optical system may further include a beam splitter or a transflective film arranged between the ocular organ of the user and the first polarization-dependent lens.

The multi-image transmitting optical system may further include a polarization beam splitter (PBS) arranged between the ocular organ of the user and the first polarization-dependent lens, and a fourth QWP arranged between the polarization beam splitter and the first polarization-dependent lens.

The first polarization-dependent lens may have a first optical directionality and the second polarization-dependent lens may have a second optical directionality that is opposite the first optical directionality.

The image forming device may include a spatial light modulator (SLM).

The multi-image display apparatus may further include at least one additional lens that is arranged in front of or in a rear of the image generator.

The at least one additional lens may be configured to reduce chromatic dispersion with respect to the first image in the multi-image transmitting optical system.

The multi-image display apparatus may further include an image signal processor that is connected to the image generator, wherein the image signal processor is configured to reduce chromatic dispersion with respect to the first image in the multi-image transmitting optical system.

The multi-image display apparatus may have an angle of view greater than or equal to about 15°. The multi-image display apparatus may have an angle of view greater than or equal to about 40°. The multi-image display apparatus may have an angle of view greater than or equal to about 60° or an angle of view greater than or equal to about 100°.

The multi-image display apparatus may be configured to implement an augmented reality (AR) and/or a mixed reality (MR).

At least a part of the multi-image display apparatus may include a wearable device.

The multi-image display apparatus may include a head mounted display (HMD).

The multi-image display apparatus may include a glasses-type display or a goggle-type display.

According to an aspect of another example embodiment, a see-through type display apparatus includes an image generator configured to generate a first image, and a see-through type optical system configured to transfer the first image and a second image that is different from the first image to an ocular organ of a user, wherein the see-through type optical system comprises first and second polarization-dependent lenses, each of which has a respective focal length that varies based on a polarization direction of incident light, wherein each of the first and second polarization-dependent lenses has a positive (+) focal length with respect to the first image or light that corresponds to the first image passes twice through one of the first and second polarization-dependent lenses that has a positive (+) focal length with respect to the first image, and one of the first and second polarization-dependent lenses has a positive (+) focal length with respect to the second image and the other of the first and second polarization-dependent lenses has a negative (−) focal length with respect to the second image.

The see-through type optical system may include a multipath optical member, the first and second polarization-dependent lenses which are arranged between the multipath optical member and the ocular organ of the user, and at least one polarizer and/or at least one wave plate arranged between the first and second polarization-dependent lenses or outside both of the first and second polarization-dependent lenses.

The see-through type optical system may include a transflective member arranged between the first and second polarization-dependent lenses, and at least one polarizer and/or at least one wave plate arranged between the transflective member and the first and second polarization-dependent lenses or outside both of the transflective member and the first and second polarization-dependent lenses.

The see-through type display apparatus may have an angle of view greater than or equal to about 15°. The see-through type display apparatus may have an angle of view greater than or equal to about 40°. The see-through type display apparatus may have an angle of view greater than or equal to about 60° or an angle of view greater than or equal to about 100°.

The see-through type display apparatus may be configured to implement an augmented reality (AR) and/or a mixed reality (MR).

At least a part of the see-through type display apparatus may include a wearable device.

The see-through type display apparatus may include a head mounted display (HMD).

The see-through type display apparatus may include a glasses-type display or a goggle-type display.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
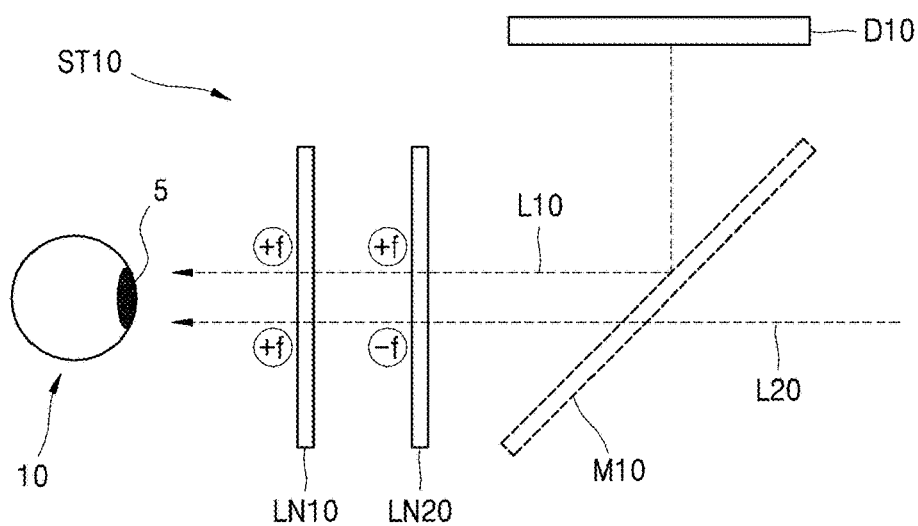
FIG. 1 schematically illustrates a display apparatus, according to an example embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only, and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, display apparatuses (multi-image display apparatuses and see-through type display apparatuses) according to example embodiments, and electronics apparatuses including the display apparatuses, are described in detail with reference to the accompanying drawings. In the drawings, widths and thicknesses of layers or regions may be exaggerated to a degree for clarity of the specification and for convenience of description. Throughout the detailed description section of the present disclosure, like reference numerals denote like constituent elements.

FIG. 1 schematically illustrates a display apparatus, according to an example embodiment. A display apparatus according to the present example embodiment may be a multi-image display apparatus or a see-through type display apparatus.

Referring to FIG. 1, the display apparatus according to the present example embodiment may include an image forming device (also referred to herein as an "image generator") D10 for generating a first image. The display apparatus may include a multi-image transmitting optical system ST10 for transmitting the first image and a second image that is different from the first image to an ocular organ 10 of a user. The multi-image transmitting optical system ST10 may be a kind of a see-through type optical system. The ocular organ 10 may be a user's eye having a pupil 5. The multi-image transmitting optical system ST10 may transfer each of a plurality of images, that is, the first image and at least the second image, to the ocular organ 10 of the user via different respective paths. For example, the multi-image transmitting optical system ST10 may transfer/guide the first image to the ocular organ 10 of the user, respectively by light L10 that propagates along a first path (i.e., a first-path light L10); and the multi-image transmitting optical system ST10 may transfer/guide the second image to the ocular organ 10 of the user by light L20 that propagates along a second path (i.e., a second-path light L20). The light L10 that propagates along the first path may be generated by (or transferred through) the image forming device D10, and may correspond to the first image. The light L20 that propagates along the second path may be external light transmitted through the multi-image transmitting optical system ST10, and may correspond to the second image.

The multi-image transmitting optical system ST10 may include a multipath optical member M10 which is configured for providing an optical multipath function. The light L10 that propagates along the first path may travel, for example, by being reflected from the multipath optical member M10, whereas the light L20 that propagates along the second path may travel, for example, by propagating through the multipath optical member M10. In this case, the multipath optical member M10 may be a transflective member. In a detailed example, the multipath optical member M10 may include any of a polarization beam splitter (PBS), a beam splitter (BS), and/or a transflective film.

The multi-image transmitting optical system ST10 may include at least two polarization-dependent lenses LN10 and LN20, each having a respective focal length that varies based a polarization state of incident light. In the present example embodiment, the two polarization-dependent lenses LN10 and LN20, that is, the first and second polarization-dependent lenses LN10 and LN20, are provided. The first and second polarization-dependent lenses LN10 and LN20 may be arranged in front of the ocular organ 10 of the user, that is, between the ocular organ 10 and the multipath optical member M10. Each of the first and second polarization-dependent lenses LN10 and LN20 may have a respective focal length that varies according to a polarization state (e.g., a polarization direction) of light incident on the same, that is, the incident light. In this regard, each of the first and second polarization-dependent lenses LN10 and LN20 may be referred to as a "polarization-dependent focusing lens".

A combination of the two polarization-dependent lenses LN10 and LN20 may exhibit optically different characteristics with respect to the light L10 that propagates along the first path and the light L20 that propagates along the second path. In other words, the combination of the two polarization-dependent lenses LN10 and LN20 may exhibit optically different characteristics with respect to the first image and the second image. In detail, the combination of the two polarization-dependent lenses LN10 and LN20 may be configured to reinforce refractive power with respect to the first image, that is, the light L10 that propagates along the first path, and to offset refractive power with respect to the second image, that is, the light L20 that propagates along the second path. Furthermore, the combination of the two polarization-dependent lenses LN10 and LN20 may be configured to have a positive (+) focal length with respect to the first image, that is, the light L10 that propagates along the first path, and to have an infinite ($\infty$) focal length or substantially infinite ($\infty$) focal length with respect to the second image, that is, the light L20 that propagates along the second path.

In the present example embodiment, each of the first and second polarization-dependent lenses LN10 and LN20 may have a positive (+) focal length with respect to the light L10 that propagates along the first path. Accordingly, the combination of the first and second polarization-dependent lenses LN10 and LN20 may work as a "convex lens" having a strong or relatively strong positive (+) refractive power with respect to the light L10 that propagates along the first path. One of the first and second polarization-dependent lenses LN10 and LN20 may have a positive (+) focal length and the other may have a negative (−) focal length with respect to the light L20 that propagates along the second path. Although FIG. 1 illustrates that the first polarization-dependent lens LN10 has a positive (+) focal length and the second polarization-dependent lens LN20 has a negative (−) focal length with respect to the light L20 that propagates along the second path, these signs may be reversed. The combination of the first and second polarization-dependent lenses LN10 and LN20 may have a "0" or substantially "0" refractive power with respect to the light L20 that propagates along the second path (offset refractive power). In other words, the combination of the first and second polarization-dependent lenses LN10 and LN20 may have infinite (∞) or substantially infinite (∞) focal length. In this case, the combination of the first and second polarization-dependent lenses LN10 and LN20 may function as a "flat plate" (transparent medium) with respect to the light L20 that propagates along the second path. The flat plate, which is a concept that contrasts with that of a lens, may be a plate (translucent plate) that does not substantially converge or diverge incident light.

The first image transferred by the light L10 that propagates along the first path may be an image that is formed and provided by the image forming device D10 in the display apparatus. The first image may be a "display image" that includes virtual reality or virtual information. The second image transferred by the light L20 that propagates along the second path may be an external image that the user faces (i.e., an external image that is visible to the user) through the display apparatus. The second image may include a foreground image that the user faces, and a certain background subject. The second image may be an image of the real world. Accordingly, according to the present example embodiment, the display apparatus (multi-image/see-through type display apparatus) may be applied to the implementation of an augmented reality (AR) and/or a mixed reality (MR). In this case, the display apparatus may be a near-eye AR display apparatus.

The image forming device D10 may include, for example, a spatial light modulator (SLM). The SLM may be any of a transmissive light modulator, a reflective light modulator, or a transflective light modulator. In a detailed example, the SLM may include any of a liquid crystal on silicon (LCoS) panel, a liquid crystal display (LCD) panel, or a digital light projection (DLP) panel. The DLP panel may include a digital micromirror device (DMD). FIG. 1 illustrates a case in which the image forming device D10 includes a transmissive light modulator. Although not illustrated, a light source unit configured for irradiating light toward the image forming device D10 may be further provided. The image forming device D10 may be arranged between the light source unit and the multi-image transmitting optical system ST10. In some cases, the image forming device D10 may include a light-emitting diode (LED) display device or an organic LED (OLED) display device. An image embodied by using the image forming device D10 may be a two-dimensional (2D) image or a three-dimensional (3D) image. The 3D image may be any of a hologram image, a stereo image, a light field image, or an integral photography (IP) image. The image forming device D10 may be a kind of a display device or a micro-display device, whose configuration is not limited to the above descriptions and may be changed in any of various ways.

Figure 2A:
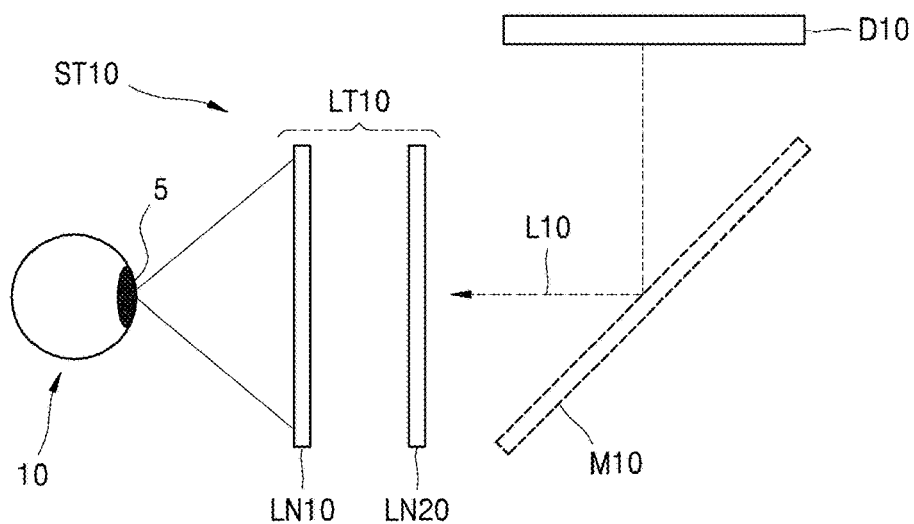
FIGS. 2A and 2B are drawings for explaining the principle and function of the display apparatus of FIG. 1.
Figure 2B:
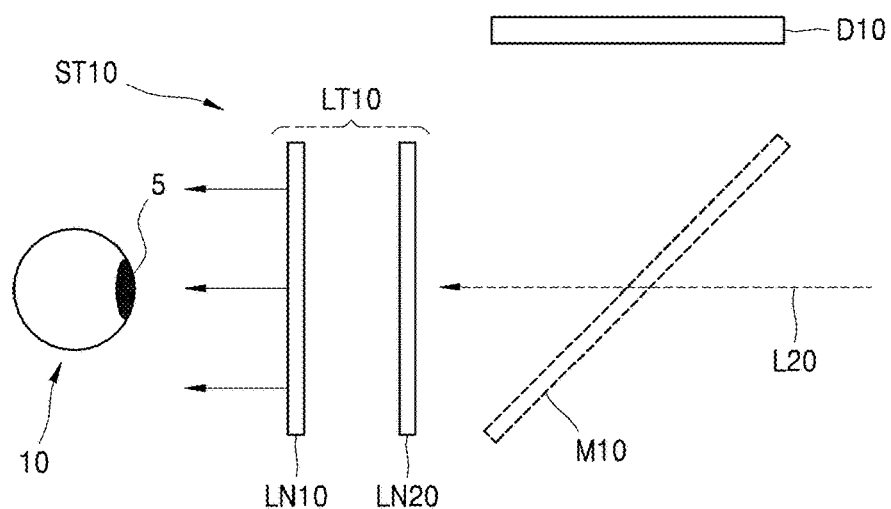

In the following description, referring to FIGS. 2A and 2B, a manner by which the combination of the polarization-dependent lenses LN10 and LN20 functions differently with respect to the light L10 that propagates along the first path and the light L20 that propagates along the second path is described in detail. In FIGS. 2A and 2B, the combination of the polarization-dependent lenses LN10 and LN20 is indicated as one lens system LT10.

As illustrated in FIG. 2A, the light L10 that propagates along the first path may be transferred to the ocular organ 10 by sequentially passing through the second polarization-dependent lens LN20 and the first polarization-dependent lens LN10. Each of the first and second polarization-dependent lenses LN10 and LN20 may have a positive (+) focal length with respect to the light L10 that propagates along the first path. Accordingly, the combination of the first and second polarization-dependent lenses LN10 and LN20 may function as a lens, that is, a kind of a convex lens, having a positive (+) refractive power with respect to the light L10 that propagates along the first path. The refractive power with respect to the first image that corresponds to the light L10 that propagates along the first path may be reinforced by the first and second polarization-dependent lenses LN10 and LN20. Due to the combination of the lenses LN10 and LN20, that is, the lens system LT10, the ocular organ 10 of the user may see a display image, that is, the first image, which is formed by the light L10 that propagates along the first path. Since the lens system LT10 is arranged relatively close to the ocular organ 10, the focal length of the lens system LT10 may be short compared to the diameter of the lens system LT10. When the focal length of the first polarization-dependent lens LN10 is +f and the focal length of the second polarization-dependent lens LN20 is +f, the focal length of the lens system LT10 may be +f/2. As such, as the lens system LT10 is arranged relatively close to the ocular organ 10 and the focal length of the lens system LT10 is relatively short compared to the diameter of the lens system LT10, a wide angle of view (field of view) may be easily secured.

As illustrated in FIG. 2B, the light L20 that propagates along the second path may be transferred to the ocular organ 10 by sequentially passing through the second polarization-dependent lens LN20 and the first polarization-dependent lens LN10. While one of the first and second polarization-dependent lenses LN10 and LN20 may have a positive (+) focal length, the other may have −a negative (−) focal length. Accordingly, the combination of the lenses LN10 and LN20, that is, the lens system LT10, may have an infinite (∞) or substantially infinite (∞) focal length with respect to the light L20 that propagates along the second path. In other words, the combination of the lenses LN10 and LN20 may have a "0" (i.e., zero) or substantially "0" refractive power. The lens system LT10 may work as a flat plate with respect to the light L20 that propagates along the second path. When the second image is seen by the light L20 that propagates along the second path, the lens system LT10 may work as a flat plate and thus the second image by the lens system LT10 may not be distorted. Accordingly, the user may see the second image without distortion.

Furthermore, since two polarization-dependent lenses LN10 and LN20 are used in FIG. 2B, chromatic dispersion/chromatic aberration of the light L20 that propagates along the second path may be prevented or reduced. Since chromatic dispersion/chromatic aberration by the first polarization-dependent lens LN10 and chromatic dispersion/chromatic aberration by the second polarization-dependent lens LN20 are offset (or compensated for) each other, the chromatic dispersion/chromatic aberration in the whole of the lens system LT10 may be prevented or reduced. As a distance between the two polarization-dependent lenses LN10 and LN20 decreases, the performance of the offset of chromatic dispersion/chromatic aberration may be improved. Accordingly, in order to improve a chromatic dispersion prevention effect, the distance between the two polarization-dependent lenses LN10 and LN20 may be set to be about 10 mm or less or about 5 mm or less.

When the first image is a virtual display image and the second image is an image of the real world (i.e., an outside image), the lens system LT10 may function as a lens (i.e., a lens having a positive refractive power) with respect to the display image so as to increase the angle of view, and may function as a flat plate with respect to the outside image so as to prevent the distortion of the image. Furthermore, the chromatic dispersion/chromatic aberration problem may be prevented or reduced.

In a general see-through type display apparatus, in order to see the outside image in a see-through manner without distortion, a lens may not be disposed in front of the user's eye. In other words, a lens that distorts the outside image may not be arranged between the user's eye and the outside foreground. Accordingly, a lens that enables the user to see a virtual display image needs to be arranged by avoiding an area between the user's eye and the outside foreground (avoidance placement). However, in this case, since an optical path between the user's eye and the lens increases, the angle of view may decrease. For example, when the lens is arranged as in the related art, the angle of view may become very narrow to a degree of about 15° or about 20°.

However, according to an example embodiment, as the lens system LT10 is arranged between the ocular organ 10 of the user and the multipath optical member M10, the lens system LT10 may be configured to function as a lens, for example, a convex lens, with respect to the display image, and to function as a flat plate (i.e., a transparent medium) with respect to the outside image. Accordingly, as the optical path between the ocular organ 10 of the user and the lens system LT10 is shortened, a wide angle of view may be easily secured. Further, the outside image may be seen without distortion as the lens system LT10 functions as a flat plate. The display apparatus may have an angle of view greater than or equal to about 40° or greater than or equal to about 60°. The angle of view may be about 100° or greater.

Figure 3:
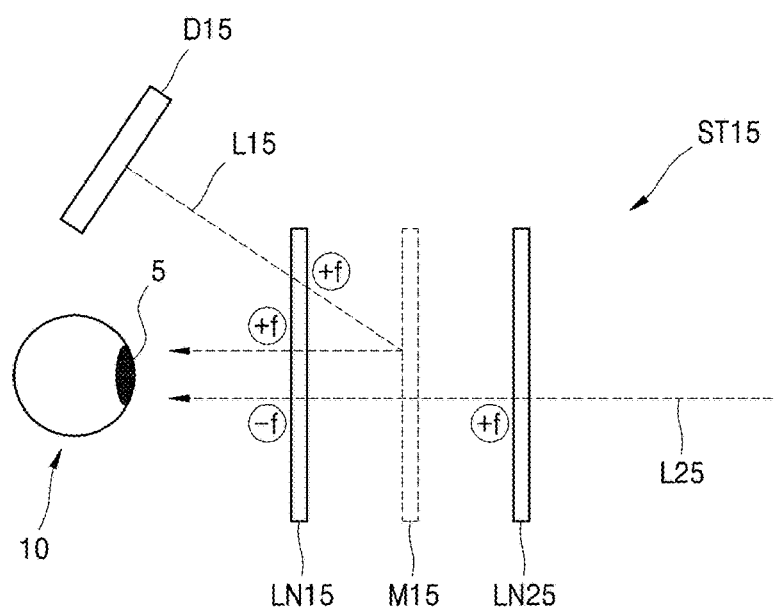
FIG. 3 schematically illustrates a display apparatus, according to another example embodiment.

FIG. 3 schematically illustrates a display apparatus, according to another example embodiment. The display apparatus of the present example embodiment may be a multi-image display apparatus or a see-through type display apparatus.

Referring to FIG. 3, the display apparatus may include an image forming device (also referred to herein as an "image generator") D15 which is configured for forming or generating a first image. The display apparatus may include a multi-image transmitting optical system ST15 configured for transferring the first image and a second image that is different from the first image to the ocular organ 10 of the user. The multi-image transmitting optical system ST15 may be a see-through type optical system.

The multi-image transmitting optical system ST15 may include at least two polarization-dependent lenses LN15 and LN25. In the present example embodiment, the two polarization-dependent lenses LN15 and LN25, that is, the first and second polarization-dependent lenses LN15 and LN25, are provided. Each of the first and second polarization-dependent lenses LN15 and LN25 may have a different respective focal length based on a polarization state, for example, a polarization direction, of incident light. The multi-image transmitting optical system ST15 may include a multipath optical member M15 arranged between the first and second polarization-dependent lenses LN15 and LN25. The multipath optical member M15 may be a transflective member. For example, the multipath optical member M15 may be a half mirror or a transflective film, or the multipath optical member M15 may be a beam splitter or a polarization beam splitter.

The first image formed by the image forming device D15 may be transferred to the ocular organ 10 of the user by light L15 that propagates along a first path. For example, the light L15 that propagates along the first path may pass through the first polarization-dependent lens LN15, may be reflected by the multipath optical member M15, and may pass through the first polarization-dependent lens LN15, so as to be transferred to the ocular organ 10. Light L25 that propagates along a second path that corresponds to the second image may be transferred to the ocular organ 10 from the outside of the multi-image transmitting optical system ST15 by passing through the multi-image transmitting optical system ST15. The light L25 that propagates along the second path may be transferred to the ocular organ 10 by sequentially passing through the second polarization-dependent lens LN25, the multipath optical member M15, and the first polarization-dependent lens LN15.

When the light L15 that propagates along the first path is transferred to the ocular organ 10 by passing twice through the first polarization-dependent lens LN15 in the different directions, the first polarization-dependent lens LN15 may have a positive (+) focal length +f with respect to the light L15 for both of the times when the light L15 that propagates along the first path passes through the first polarization-dependent lens LN15. Accordingly, the refractive power to the light L15 that propagates along the first path may be reinforced by two times. In other words, the focal length may be decreased by half (½) (i.e., a 50% reduction). While one of the first and second polarization-dependent lenses LN15 and LN25 may have a positive (+) focal length +f with respect to the light L25 that propagates along the second path, the other may have a negative (−) focal length −f. Accordingly, the refractive power with respect to the light L25 that propagates along the second path may be offset. In other words, the focal length with respect to the light L25 that propagates along the second path may be infinite or substantially infinite. The effects on the light L15 that propagates along the first path and the light L25 that propagates along the second path may be the same or substantially the same as those described in FIG. 1 and FIGS. 2A and 2B. Accordingly, the angle of view may be increased with respect to the first image by the light L15 that propagates along the first path, and the distortion of the second image by the light L25 that propagates along the second path may be prevented. Furthermore, the chromatic dispersion/chromatic aberration may be prevented or reduced.

Figure 4A:
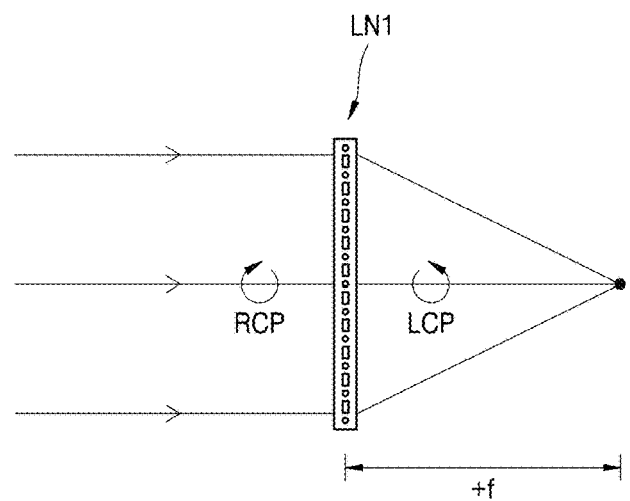
FIGS. 4A and 4B are drawings for explaining characteristics of a polarization-dependent lens which is applicable to a lens system of a display apparatus, according to an example embodiment.
Figure 4B:
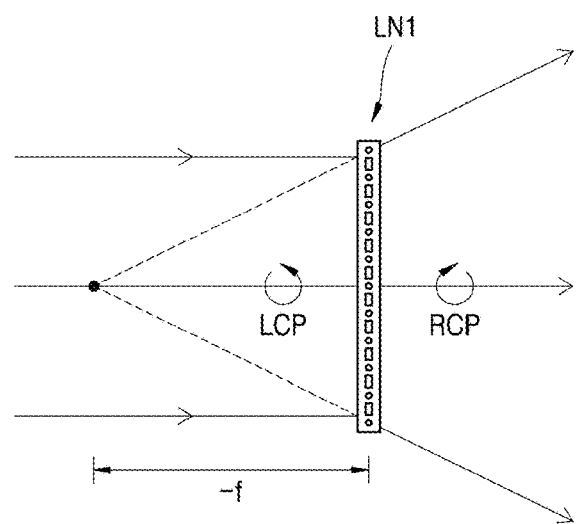
Figure 5A:
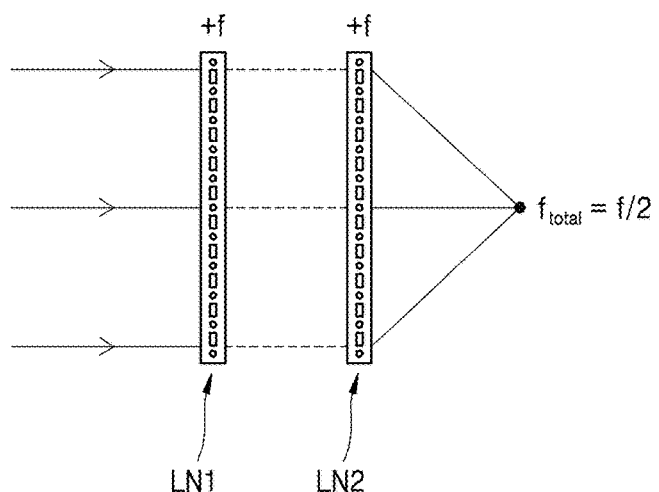
FIGS. 5A and 5B are drawings for explaining characteristics of a lens system having a combination of a plurality of polarization-dependent lenses which is applicable to a display apparatus, according to an example embodiment.
Figure 5B:
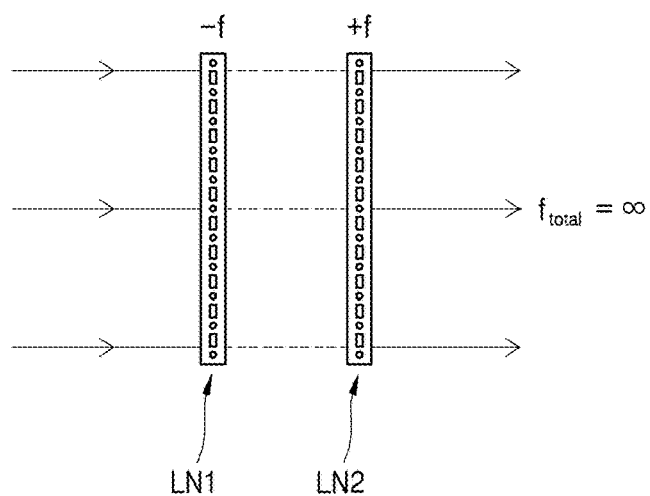

In the following description, referring to FIGS. 4A and 4B and FIGS. 5A and 5B, the characteristics of a polarization-dependent lens, for example, the polarization-dependent lens LN10 or LN20 of FIG. 1, and the characteristics of a lens system of a combination of the polarization-dependent lenses LN10 and LN20, are described in detail. FIGS. 4A and 4B illustrate the characteristics of a polarization-dependent lens LN1. FIGS. 5A and 5B illustrate the characteristics of a lens system of a combination of polarization-dependent lenses LN1 and LN2.

FIGS. 4A and 4B are drawings for explaining the characteristics of the polarization-dependent lens LN1 which is applicable to a lens system of a display apparatus, according to an example embodiment.

Referring to FIG. 4A, the polarization-dependent lens LN1 may have a positive (+) focal length +f with respect to incident light having a first polarization direction. The focal length +f may be referred to as a first focal length $f_1$. Accordingly, the polarization-dependent lens LN1 may function as a lens, that is, a convex lens, that has a positive (+) refractive power with respect to incident light having the first polarization direction. The first polarization direction may be, for example, right-hand circular polarization (RCP). Light of right-hand circular polarization (RCP) may be changed to light of left-hand circular polarization (LCP) while passing through the polarization-dependent lens LN1.

Referring to FIG. 4B, the polarization-dependent lens LN1 may have a negative (−) focal length −f with respect to incident light having a second polarization direction. The focal length −f may be referred to as a second focal length $f_2$. Accordingly, the polarization-dependent lens LN1 may function as a lens, that is, a concave lens, that has a negative (−) refractive power with respect to incident light having the second polarization direction. The second polarization direction may be a direction that is orthogonal to the first polarization direction. For example, the second polarization direction may be left-hand circular polarization (LCP). The light of the left-hand circular polarization (LCP) may be changed to the light to the right-hand circular polarization (RCP) while passing through the polarization-dependent lens LN1. An absolute value of the second focal length $f_2$ may be the same or substantially the same as an absolute value of the first focal length $f_1$. Accordingly, the polarization-dependent lens LN1 may have a focal length that has an opposite sign and a same magnitude with respect to the incident light having the first polarization direction and the incident light having the second polarization direction.

The polarization-dependent lens LN1 described with reference to FIGS. 4A and 4B may include, for example, a plurality of nonlinear material elements that form a certain pattern. The polarization-dependent lens LN1 may exhibit the characteristics illustrated in FIGS. 4A and 4B by the pattern of the nonlinear material elements. The nonlinear material elements may include, for example, a liquid crystal polymer. The nonlinear material elements are described below in detail with reference to FIG. 6.

Although FIGS. 4A and 4B illustrate a case in which the polarization-dependent lens LN1 has a positive (+) focal length with respect to the RCP incident light and a negative (−) focal length with respect to the LCP incident light, this is exemplary, and the polarization direction indicating a positive (+) or negative (−) focal length may vary. In particular, the polarization direction indicating a positive (+) or negative (−) focal length may vary based on how the polarization-dependent lens LN1 is configured. In some cases, the polarization-dependent lens LN1 may have a positive (+) focal length with respect to the LCP incident light and a negative (−) focal length with respect to the RCP incident light, or a positive (+) focal length with respect to first linearly polarized light and a negative (−) focal length with respect to second linearly polarized light which is orthogonal to the first linearly polarized light. When the first polarization direction and the second polarization direction are orthogonal to each other, the polarization-dependent lens LN1 may have a positive (+) focal length with respect to any one of the first polarization direction and the second polarization direction and a negative (−) focal length with respect to the other of the first polarization direction and the second polarization direction.

FIGS. 5A and 5B are drawings for explaining the characteristics of a lens system having a combination of a plurality of polarization-dependent lenses which is applicable to a display apparatus, according to an example embodiment. In the present example embodiment, the polarization-dependent lenses may include the first and second polarization-dependent lenses LN1 and LN2, and each of the first and second polarization-dependent lenses LN1 and LN2 may have the characteristics of the polarization-dependent lens LN1 described with reference to FIGS. 4A and 4B.

Referring to FIG. 5A, each of the first and second polarization-dependent lenses LN1 and LN2 may have a positive (+) focal length +f with respect to a certain first incident light. Accordingly, a lens system (i.e., a compound lens or a combined lens) having a combination of the first and second polarization-dependent lenses LN1 and LN2 may have a focal length of +f/2 with respect to the first incident light. In particular, a total focal length $f_{total}$ of the lens system may be +f/2. This may correspond to the half (½) of the respective focal length +f of each of the first and second polarization-dependent lenses LN1 and LN2. In terms of refractive power, it may be said that the refractive power is reinforced twice. As such, since the lens system having a combination of the first and second polarization-dependent lenses LN1 and LN2 may have a strong refractive power (short focal length) that corresponds to double the refractive power of the first polarization-dependent lens LN1 or the second polarization-dependent lens LN2 with respect to the first incident light, an effect of increase in the angle of view with respect to the first incident light may be very high. In this connection, the angle of view of the display apparatus as illustrated in FIG. 1 may be about 40° or more, about 60° or more, or about 100° or more. In addition, when the lens system of FIG. 5A is applied to the display apparatus of FIG. 1, an interval between the ocular organ 10 and the lens system may be, for example, about 10 mm to about 40 mm. Considering the interval, the focal length of the lens system may be about 10 mm to about 40 mm. However, this is merely exemplary, and the focal length of the lens system may be about 10 mm or less or about 40 mm or more.

Referring to FIG. 5B, with respect to a certain second incident light, one of the first and second polarization-dependent lenses LN1 and LN2 may have a positive (+) focal length +f and the other of the first and second polarization-dependent lenses LN1 and LN2 may have a negative (−) focal length −f. Accordingly, the lens system that includes a combination of the first and second polarization-dependent lenses LN1 and LN2 (i.e., a compound lens or a combined lens) may have an infinite (∞) or substantially infinite (∞) focal length with respect to the second incident light. In this aspect, the total focal length $f_{total}$ of the lens system may be infinite (∞) or substantially infinite (∞). It may be said that the lens system has a refractive power of zero (0) or substantially has a refractive power of zero (0). Accordingly, the lens system may function as a flat plate (transparent medium) with respect to the second incident light. Furthermore, since a chromatic dispersion effect by the first polarization-dependent lens LN1 and a chromatic dispersion effect by the second polarization-dependent lens LN2 are offset/compensated for by each other, the lens system that includes the above combined lenses may effectively prevent or reduce the chromatic dispersion problem.

Figure 6:
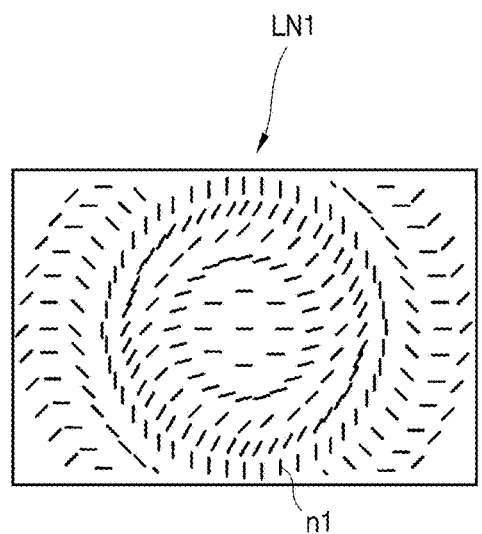
FIG. 6 is a plan view illustrating an example of a configuration of a polarization-dependent lens which is applicable to a display apparatus, according to an example embodiment.

FIG. 6 is a plan view illustrating an example of a configuration of the first polarization-dependent lens LN1 which is applicable to a display apparatus, according to an example embodiment.

Referring to FIG. 6, the polarization-dependent lens LN1 may include a plurality of nonlinear material elements (nonlinear material elements) n1 forming a certain pattern.

The nonlinear material elements n1 may include, for example, liquid crystal polymers. However, this is merely exemplary, and a detailed material of the nonlinear material element n1 may vary. The nonlinear material elements n1 may form a planar (two-dimensional) pattern. In some cases, a pattern may be formed in a thickness direction of the polarization-dependent lens LN1. Due to such a pattern array of the nonlinear material elements n1, the polarization-dependent lens LN1 may exhibit characteristics that vary based on the polarization direction of incident light. In particular, the polarization-dependent lens LN1 may have a first positive (+) focal length with respect to incident light having a first polarization direction and a second negative (−) focal length with respect to incident light having a second polarization direction. In this state, an absolute value of the first focal length and an absolute value of the second focal length may be the same or substantially the same.

The polarization-dependent lens LN1 may have a length and a width of, for example, several millimeters to tens of millimeters, and a relatively thin thickness of about several millimeters or less. As an example, the thickness of the polarization-dependent lens LN1 may be less than about 1 mm. Furthermore, the polarization-dependent lens LN1 may have a flat structure and may not generate spherical aberration when operated as a single lens. Furthermore, the polarization-dependent lens LN1 may have flexible characteristics. The focal length +f of the polarization-dependent lens LN1 may be several millimeters to hundreds of millimeters. For example, the focal length +f of the polarization-dependent lens LN1 may be about 10 mm to about 100 mm. However, the above-described size and characteristics of the polarization-dependent lens LN1 are exemplary and may vary.

The first and second polarization-dependent lenses LN1 and LN2 described with reference to FIGS. 4A and 4B, FIGS. 5A and 5B, and FIG. 6 may be geometric phase (GP) lenses. The functions of the first and second polarization-dependent lenses LN1 and LN2 may be implemented by controlling a diffraction condition of light by using the pattern of the nonlinear material elements n1. The GP lenses may be applied to the polarization-dependent lenses LN10, LN15, LN20, and LN25 described with reference to FIGS. 1, 2A, 2B, and 3.

Figure 7:
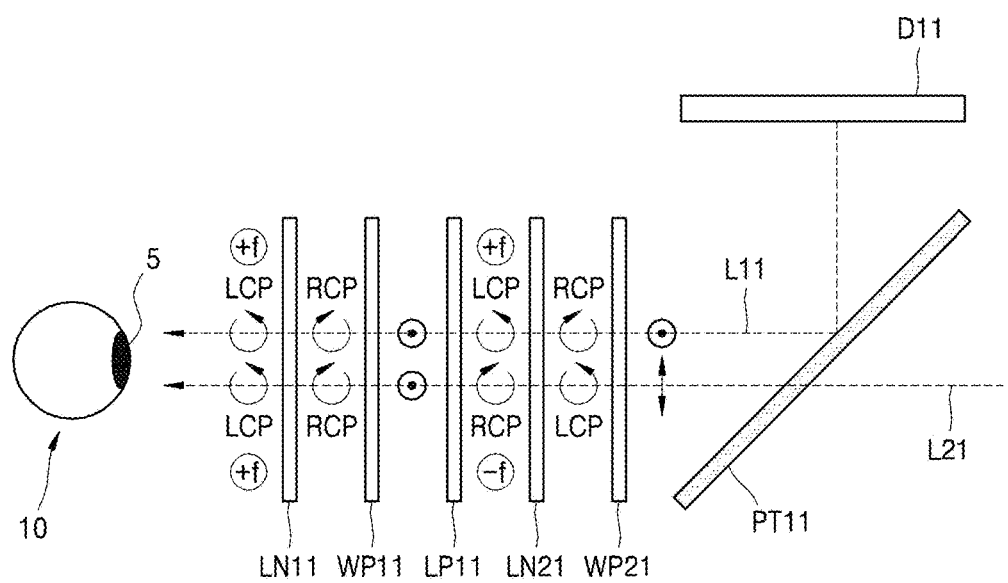
FIG. 7 illustrates a configuration of a display apparatus, according to an example embodiment.

FIG. 7 illustrates a configuration of a display apparatus, according to an example embodiment. The display apparatus of the present example embodiment may be an example of the embodiment of the concept of FIG. 1. The display apparatus may be a multi-image display apparatus or a see-through type display apparatus. Furthermore, the display apparatus may be a near-eye display apparatus.

Referring to FIG. 7, the display apparatus may include an image forming device (also referred to herein as an "image generator") D11 for forming or generating a first image. The display apparatus may include a polarization beam splitter PT11 for transferring a second image, which is different from the first image formed by the image forming device D11, to the ocular organ 10 of the user along a different path. The polarization beam splitter PT11 may be an example of a multipath optical member. The first image may transferred by light L11 that propagates along a first path, and the second image may be transferred by light L21 that propagates along a second path.

The display apparatus may include at least two polarization-dependent lenses LN11 and LN21 arranged between the polarization beam splitter PT11 and the ocular organ 10. For example, the two polarization-dependent lenses LN11 and LN21 may be the first and second polarization-dependent lenses LN11 and LN21. At least one of the first and second polarization-dependent lenses LN11 and LN21 may correspond to the polarization-dependent lenses LN1, LN2, LN10, LN15, LN20, and LN25 described above with reference to FIGS. 1 to 6. Furthermore, the display apparatus may further include at least one polarizer and/or at least one wave plate arranged between the two polarization-dependent lenses LN11 and LN21 or outside thereof. In a detailed example, a first linear polarizer LP11 may be arranged between the first and second polarization-dependent lenses LN11 and LN21; a first quarter-wave plate (QWP) WP11 may be arranged between the first polarization-dependent lens LN11 and the first linear polarizer LP11; and a second QWP WP21 may be arranged between the second polarization-dependent lens LN21 and the polarization beam splitter PT11.

The light L11 that propagates along the first path may be linearly polarized in a first-1 direction by being reflected by the polarization beam splitter PT11. The first-1 direction may be, for example, a direction that is orthogonal to the drawing sheet. The light L11 that propagates along the first path may be circularly polarized in a second-1 direction (i.e., right-hand circular polarized; RCP) by the second QWP WP21, circularly polarized in a second-2 direction (i.e., left-hand circular polarized; LCP) by the second polarization-dependent lens LN21, linearly polarized in the first-1 direction by the first linear polarizer LP11, circularly polarized in the second-1 direction (RCP) by the first QWP WP11, and circularly polarized in the second-2 direction (LCP) by the first polarization-dependent lens LN11. In the process, the second polarization-dependent lens LN21 may have a positive (+) focal length with respect to the light L11 that propagates along the first path, and the first polarization-dependent lens LN11 may have a positive (+) focal length with respect to the light L11 that propagates along the first path. Accordingly, the combination of the first and second polarization-dependent lenses LN11 and LN21 may reinforce the refractive power with respect to the light L11 that propagates along the first path.

While passing through the polarization beam splitter PT11, the light L21 along the second path is linearly polarized in a first-2 direction, for example, in a direction that is orthogonal to the first-1 direction. The light L21 that propagates along the second path may be circularly polarized in the second-2 direction (LCP) by the second QWP WP21, circularly polarized in the in the second-1 direction (RCP) by the second polarization-dependent lens LN21, linearly polarized in the first-1 direction by the first linear polarizer LP11, circularly polarized in the second-1 direction (RCP) by the first QWP WP11, and circularly polarized in the second-2 direction (LCP) by the first polarization-dependent lens LN11. In the process, the second polarization-dependent lens LN21 may have a negative (−) focal length with respect to the light L21 that propagates along the second path, and the first polarization-dependent lens LN11 may have a positive (+) focal length with respect to the light L21 that propagates along the second path. Accordingly, the combination of the first and second polarization-dependent lenses LN11 and LN21 may offset the refractive power with respect to the light L21 that propagates along the second path.

The combination of the first and second polarization-dependent lenses LN11 and LN21 may increase the angle of view with respect to the first image and prevent distortion with respect to the second image. Furthermore, the combination of the first and second polarization-dependent lenses LN11 and LN21 may prevent or reduce the chromatic dispersion/chromatic aberration problem with respect to the second image.

Figure 8:
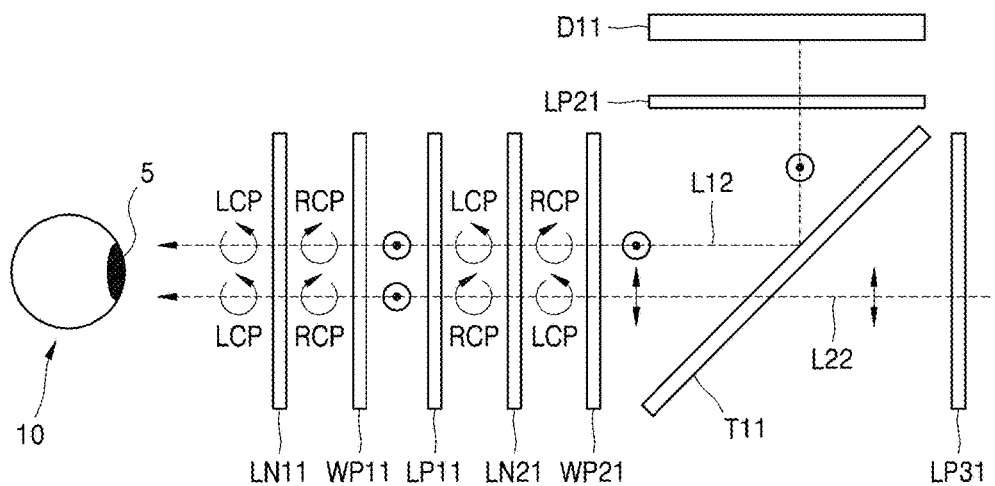
FIG. 8 illustrates a configuration of a display apparatus, according to another example embodiment.

FIG. 8 illustrates a configuration of a display apparatus, according to another example embodiment. In the present example embodiment, a transflective member T11 having no intrinsic polarization function is used instead of the polarization beam splitter PT11 of FIG. 7.

Referring to FIG. 8, the transflective member T11 may be used as a multipath optical member. The transflective member T11 may not have the intrinsic polarization function. The transflective member T11 may be, for example, a beam splitter or a transflective film. In this case, a second linear polarizer LP21 may be further arranged between the transflective member T11 and the image forming device D11, and a third linear polarizer LP31 may be further be arranged to face the second QWP WP21 with respect to the transflective member T11 interposed between the third linear polarizer LP31 and the second QWP WP21. The second linear polarizer LP21 may be arranged at a side which is adjacent to a first incident surface of the transflective member T11, and the third linear polarizer LP31 may be arranged at a side which is adjacent to a second incident surface of the transflective member T11.

Light L12 that propagates in a first path may be transferred to the second QWP WP21 by being linearly polarized in the first-1 direction by the second linear polarizer LP21 and being reflected by the transflective member T11. Light L22 that propagates in a second path may be transferred to the second QWP WP21 by being linearly polarized in the first-2 direction by the third linear polarizer LP31 and passing through the transflective member T11. The changes of the light L12 and L22 that respectively propagates along the first and second paths from the second QWP WP21 to the ocular organ 10 may be the same as those described with reference to FIG. 7. When it is difficult to use the polarization beam splitter PT11 of FIG. 7, a general non-polarizing beam splitter may be used as the transflective member T11.

Figure 9:
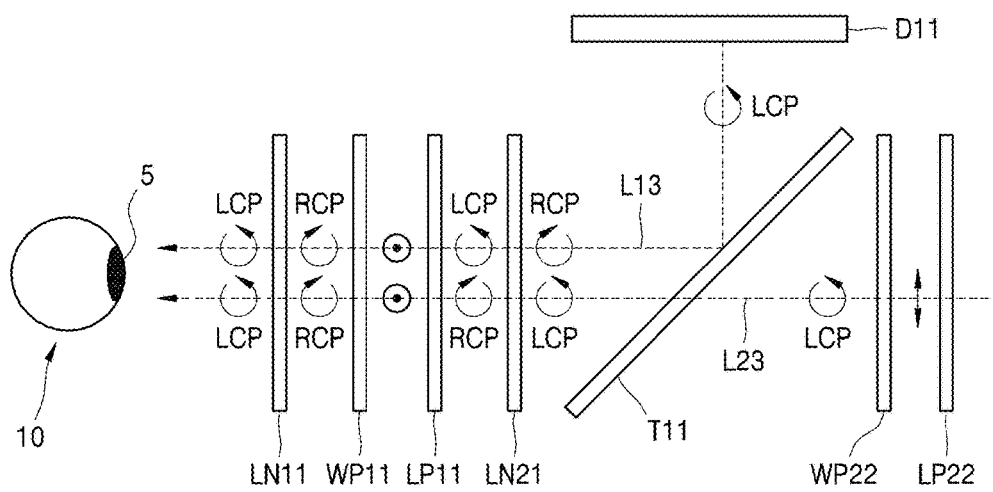
FIG. 9 illustrates a configuration of a display apparatus, according to another example embodiment.

FIG. 9 illustrates a configuration of a display apparatus, according to another example embodiment. The configuration of the present example embodiment is a modification of the configuration of FIG. 8.

Referring to FIG. 9, the transflective member T11 may be used as a multipath optical member, and a second QWP WP22 and a second linear polarizer LP22 may be provided at a side that is adjacent to an incident surface (second incident surface) of the transflective member T11. The second QWP WP22 may be arranged between the transflective member T11 and the second linear polarizer LP22. In this case, a wave plate, for example, QWP, may not be used between the transflective member T11 and the second polarization-dependent lens LN21.

Light L23 that propagates along a second path may be transferred to the second polarization-dependent lens LN21 by being linearly polarized in the first-2 direction by the second linear polarizer LP22, being circularly polarized in the second-2 direction (LCP) by the second QWP WP22, and passing through the transflective member T11. The change of the light L23 that propagates along the second path from the second polarization-dependent lens LN21 to the ocular organ 10 may be the same as that described above with reference to FIG. 7.

The light L13 that propagates along a first path may be incident on the transflective member T11 in a state of being circularly polarized in the second-2 direction (LCP) and be reflected from the transflective member T11. While being reflected from the transflective member T11, the light L13 may be circularly polarized in the second-1 direction (RCP). The circularly polarized light, when reflected, may be converted to light that is circularly polarized in the opposite direction. Accordingly, the light L13 that propagates along the first path may be transferred to the second polarization-dependent lens LN21 in a state of being circularly polarized in the second-1 direction (RCP). The conversion of the light L13 from the second polarization-dependent lens LN21 to the ocular organ 10 may be the same as that described above with reference to FIG. 7.

Although not illustrated, at least one wave plate and/or at least one polarizer may be further arranged between the transflective member T11 and the image forming device D11. The circular polarization in the second-2 direction (LCP) may be derived by using the wave plate and the polarizer. In some cases, light emitted from the image forming device D11, that is, the light L13, may be configured to have the circular polarization in the second-2 direction (LCP).

In the example embodiments of FIGS. 7, 8, and 9, the first polarization-dependent lens LN11 and the second polarization-dependent lens LN21 may have the optically same directionality, which is described below with reference to FIG. 10.

Figure 10:
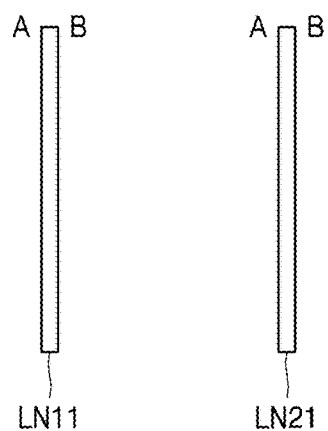
FIG. 10 is a drawing for explaining the directionality of a plurality of polarization-dependent lenses which are applicable to a display apparatus, according to an example embodiment.

Referring to FIG. 10, the first polarization-dependent lens LN11 and the second polarization-dependent lens LN21 may have the optically same directionality. The first polarization-dependent lens LN11 and the second polarization-dependent lens LN21 may be lenses that are optically equivalent to each other. Furthermore, the positions of a first surface A and a second surface B of the first polarization-dependent lens LN11 may be the same as the positions of a first surface A and a second surface B of the second polarization-dependent lens LN21. In the case of the polarization-dependent lenses LN11 and LN21, the characteristics, that is, the focal length +f or dependent f, may vary based on the arrangement direction of the lenses LN11 and LN21, that is, the light incident direction. When the first and second polarization-dependent lenses LN11 and LN21 have the same directionality as illustrated in FIG. 10, the characteristics may be obtained as described above with reference to FIGS. 7, 8, and 9. However, in FIGS. 7, 8, and 9, the first and second polarization-dependent lenses LN11 and LN21 may have the opposite directionalities. In this case, the configurations, positions, and numbers of the wave plate and/or the polarizer may be changed.

Figure 11:
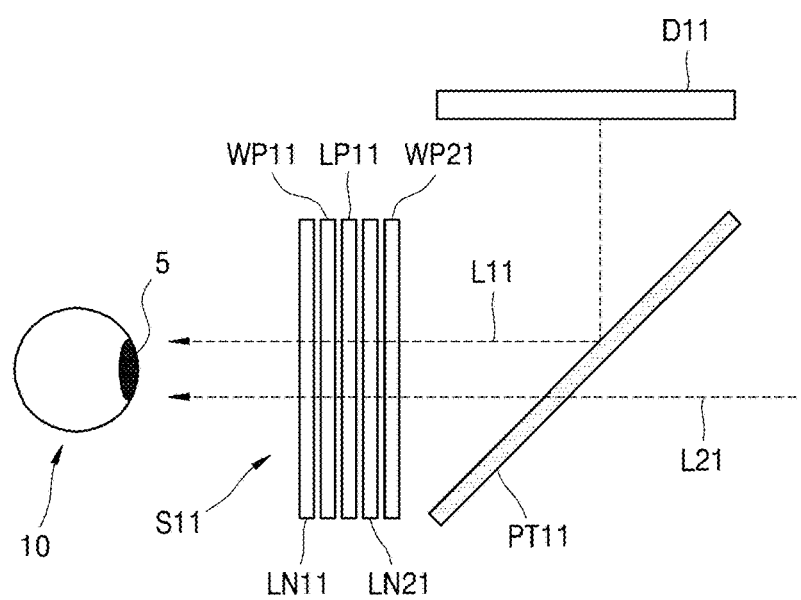
FIG. 11 illustrates a configuration of a display apparatus, according to another example embodiment.

Although, in the example embodiments of FIGS. 7, 8, and 9, the elements, for example, LN11, WP11, LP11, LN21, and WP21, arranged between the ocular organ 10 of the user and the multipath optical member, that is, PT11 and T11, are illustrated to be much spaced apart from one another, the elements may be actually arranged to be relatively close to one another or in contact with one another, and an example thereof is illustrated in FIG. 11.

Referring to FIG. 11, the first polarization-dependent lens LN11, the first QWP WP11, the first linear polarizer LP11, the second polarization-dependent lens LN21, and the second QWP WP21 may be arranged to be relatively close to one another, or at least some of them may be in contact with one another. It may be said that the elements, that is, LN11, WP11, LP11, LN21, and WP21, may constitute a single optical system S11. Each of the polarization-dependent lenses LN11 and LN21 may have a thickness of several millimeters or less, for example, about 1 mm or less. The first QWP WP11, the first linear polarizer LP11, and the second QWP WP21 may have a film shape and may have a relatively thin thickness. The optical system S11 may have a thickness of several millimeters or less, for example, about 5 mm or less or about 3 mm or less. Accordingly, the optical system S11 may have a compact configuration. However, in some cases, the optical system S11 may have a thickness of about 10 mm or greater.

In addition, according to a detailed configuration of the wave plate, that is, WP11, WP21, or WP22, used in the example embodiments of FIGS. 7, 8, and 9, the polarization characteristics/direction may be changed in other ways. Furthermore, according to a detailed configuration of the polarizer, that is, LP11, LP21, LP22, or LP31, the polarization characteristics/direction may be changed in other ways. In an example, the linear polarization in the first-1 direction or first-2 direction may be derived by using a certain polarizer, and the circular polarization in the second-1 direction or second-2 direction may be derived by using a certain wave plate. Accordingly, the changes in the polarization characteristics/direction of the lights described above with reference to FIGS. 7, 8, and 9 are exemplary and may be varied, which are identically applied to the below-described example embodiments of FIGS. 12, 13, 14, and 15.

Figure 12:
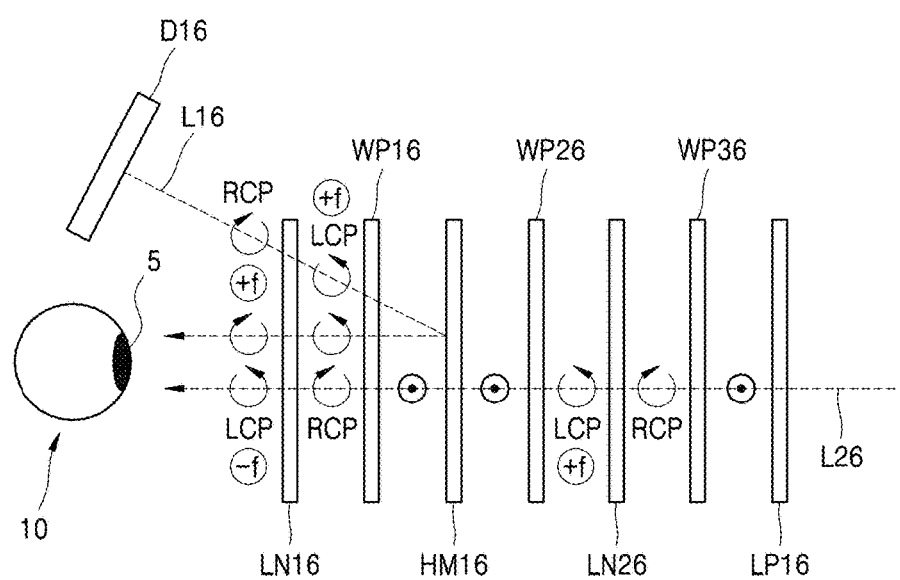
FIG. 12 illustrates a configuration of a display apparatus, according to another example embodiment.

FIG. 12 illustrates a configuration of a display apparatus, according to another example embodiment. The display apparatus of the present example embodiment may be an example of the embodiment of the concept of FIG. 3. The display apparatus may be a multi-image display apparatus or a see-through type display apparatus. Furthermore, the display apparatus may be a near-eye display apparatus.

Referring to FIG. 12, the display apparatus may include an image forming device (also referred to herein as an "image generator") D16 for forming or generating a first image. The display apparatus may include a multi-image transmitting optical system that transfers the first image and a second image that is different from the first image formed by the image forming device D16, via different paths, to the ocular organ 10 of the user. The multi-image transmitting optical system may include first and second polarization-dependent lenses LN16 and LN26, and a half mirror HF16 arranged between the first and second polarization-dependent lenses LN16 and LN26. The first polarization-dependent lens LN16, the half mirror HF16, and the second polarization-dependent lens LN26 may be sequentially arranged from the side of the ocular organ 10. The half mirror HF16 may be an example of the transflective member.

The multi-image transmitting optical system may further include at least one wave plate and/or at least one polarizer arranged between the half mirror HF16 and the first and second polarization-dependent lenses LN16 and LN26 or outside thereof. In a detailed example, a first QWP WP16 may be arranged between the first polarization-dependent lens LN16 and the half mirror HF16; a second QWP WP26 may be arranged between the half mirror HF16 and the second polarization-dependent lens LN26; a first linear polarizer LP16 may be arranged outside the second polarization-dependent lens LN26; and a third QWP WP36 may be arranged between the second polarization-dependent lens LN26 and the first linear polarizer LP16.

Light L16 that propagates along the first path may pass through the first polarization-dependent lens LN16 (first passage) in a state of being circularly polarized in the second-1 direction (RCP). In this state, the light L16 may be circularly polarized in the second-2 direction (LCP) by the first polarization-dependent lens LN16. The light L16 that propagates along the first path may be reflected from the half mirror HF16 and then pass again through the first polarization-dependent lens LN16 (second passage). As an effect of reflection from the half mirror HF16, that is, an effect of being changed to the opposite circular polarization, and an effect generated as the light L16 passes twice through the first QWP WP16 are offset, the light L16 that propagates along the first path in a state of being circularly polarized in the second-2 direction (LCP) may pass through the first polarization-dependent lens LN16 (second passage). In this state, the light L16 that propagates along the first path may be circularly polarized in the second-1 direction (RCP) by the first polarization-dependent lens LN16. During the "first passage", the first polarization-dependent lens LN16 may have a positive (+) focal length with respect to the light L16 that propagates along the first path. During the "second passage", the first polarization-dependent lens LN16 may also have a positive (+) focal length with respect to the light L16 that propagates along the first path. Accordingly, the first polarization-dependent lens LN16 may reinforce the refractive power with respect to the light L16 that propagates along the first path.

Light L26 that propagates along the second path may be linearly polarized –in the first-1 direction by the first linear polarizer LP16, circularly polarized in the second-1 direction (RCP) by the third QWP WP36, circularly polarized in the second-2 direction (LCP) by the second polarization-dependent lens LN26, and linearly polarized again in the first-1 direction by the second QWP WP26. After passing through the half mirror HM16, the light L26 that propagates along the second path may be circularly polarized in the second-1 direction (RCP) by the first QWP WP16 and circularly polarized in the second-2 direction (LCP) by the first polarization-dependent lens LN16. In the process, the second polarization-dependent lens LN26 may have a positive (+) focal length with respect to the light L26 that propagates along the second path, and the first polarization-dependent lens LN16 may have a negative (–) focal length with respect to the light L26 that propagates along the second path. Accordingly, a combination of the first and second polarization-dependent lenses LN16 and LN26 may offset the refractive power with respect to the light L26 that propagates along the second path.

The combination of the first and second polarization-dependent lenses LN16 and LN26 may increase an angle of view with respect to the first image that corresponds to the light L16 that propagates along the first path, and prevent distortion with respect to the second image that corresponds to the light L26 that propagates along the second path. Furthermore, the combination of the first and second polarization-dependent lenses LN16 and LN26 may prevent or reduce the chromatic dispersion/chromatic aberration problem with respect to the second image.

Figure 13:
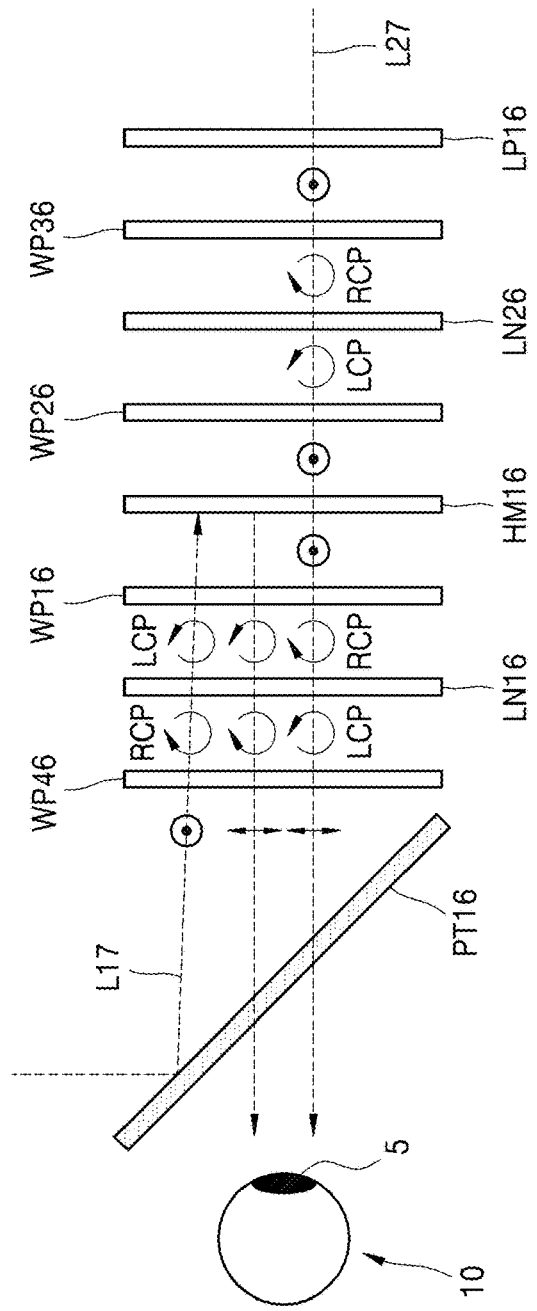
FIG. 13 illustrates a configuration of a display apparatus, according to another example embodiment.
Figure 14:
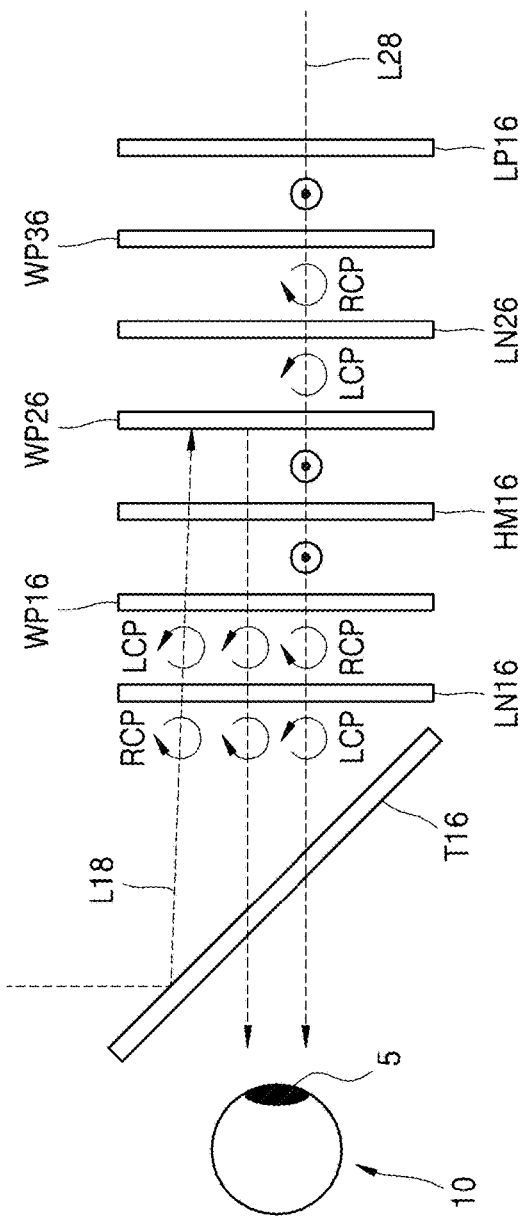
FIG. 14 illustrates a configuration of a display apparatus, according to another example embodiment.
Figure 15:
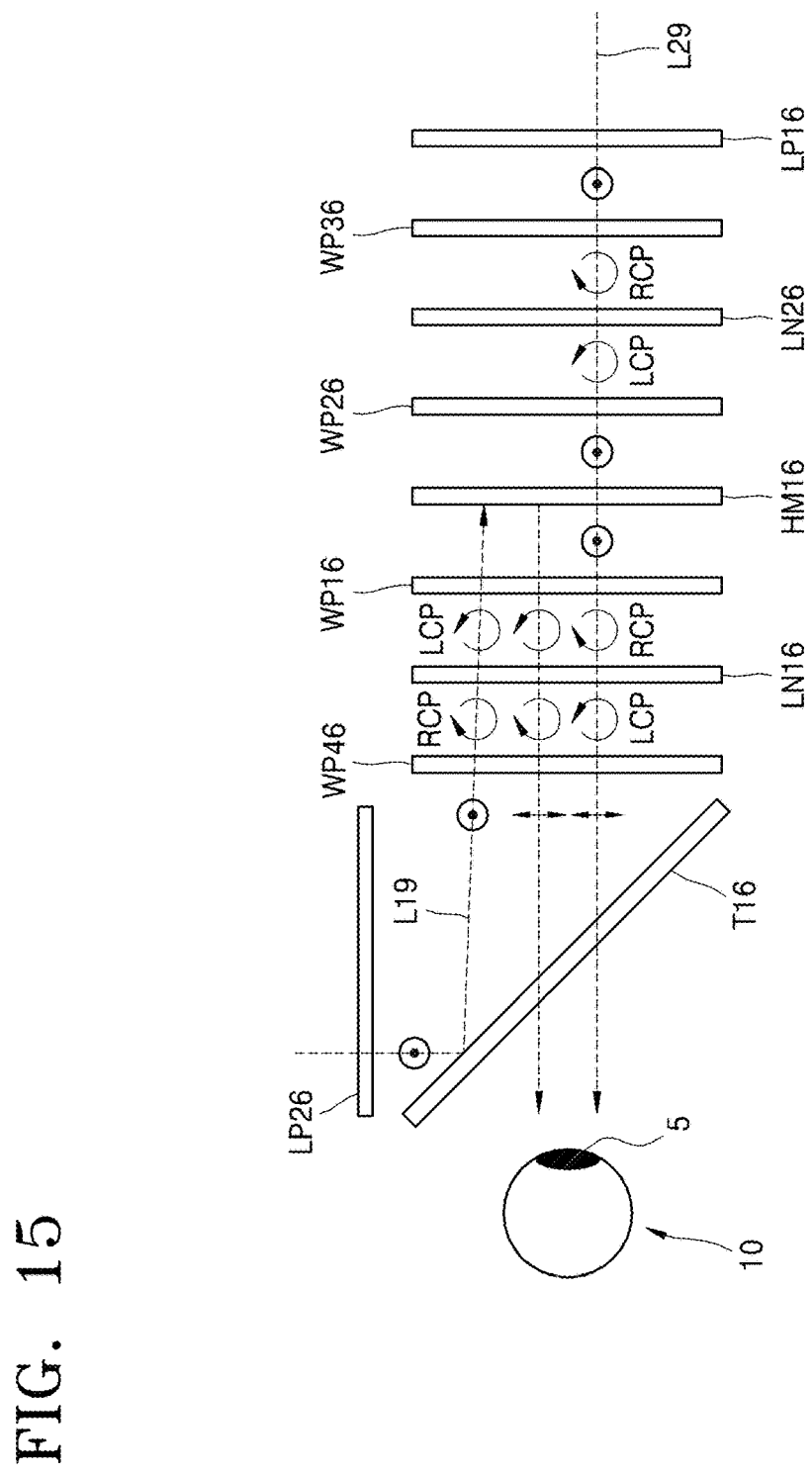
FIG. 15 illustrates a configuration of a display apparatus, according to another example embodiment.

According to another example embodiment, in the configuration of FIG. 12, a certain multipath optical member (transflective member) may be further arranged between the ocular organ 10 and the first polarization-dependent lens LN16. Examples thereof are illustrated in FIGS. 13, 14, and 15. FIGS. 13, 14, and 15 illustrate configurations of display apparatuses according to various other example embodiments.

Referring to FIG. 13, a polarization beam splitter PT16 may be provided between the ocular organ 10 and the first polarization-dependent lens LN16. In this case, a fourth QWP WP46 may be further arranged between the polarization beam splitter PT16 and the first polarization-dependent lens LN16.

Light L17 that propagates along the first path may be transferred to the first polarization-dependent lens LN16 by being linearly polarized in the first-1 direction by the polarization beam splitter PT16 and circularly polarized in the second-1 direction (RCP) by the fourth QWP WP46. Next, the light L17 may be transferred to the ocular organ 10 by passing through the first polarization-dependent lens LN16 and the first QWP WP16, by being reflected from the half mirror HM16, and by sequentially passing through the first QWP WP16, the first polarization-dependent lens LN16, and the fourth QWP WP46. In the process, the change of the light L17 that propagates along the first path may be similar to the description above with respect to FIG. 12. Light L27 that propagates along the second path may be transferred to the ocular organ 10 by passing from the first linear polarizer LP16 to the fourth QWP WP46. In the process, the change of the light L27 that propagates along the second path may be similar to the description in FIG. 12.

FIG. 14 illustrates a case in which a transflective member T16 having no intrinsic polarization function is applied between the ocular organ 10 and the first polarization-dependent lens LN16 in the configuration of FIG. 12. The transflective member T16 may be, for example, a beam splitter or a transflective film. As the transflective member T16 does not have a polarization function, the configuration other than the transflective member T16 may be the same as the configuration described above with respect to FIG. 12. However, propagation paths of lights L18 and L28 may be partially changed by the transflective member T16.

FIG. 15 illustrates a modification of the configuration of FIG. 14. In particular, FIG. 15 illustrates a case in which a fourth QWP WP46 is added between the transflective member T16 and the first polarization-dependent lens LN16, and a second linear polarizer LP26 is further added at a side of an incident surface side (upper side in the drawing) of the transflective member T16 in the configuration of FIG. 14. The configuration of FIG. 15 may be said to be a case of applying the transflective member T16 having no polarization function instead of the polarization beam splitter PT16, and the second linear polarizer LP26, to the configuration of FIG. 13. The paths and changes of the lights L19 and L29 may be similar to those described above with reference to FIGS. 13 and 14.

In the example embodiments of FIGS. 13, 14, and 15, a multipath optical member, that is, PT16 or T16, may be applied between the ocular organ 10 and the first polarization-dependent lens LN16. In this case, as the distance between the ocular organ 10 and the first polarization-dependent lens LN16 is increased, the effect of increasing an angle of view with respect to the first image may be relatively small. Accordingly, In this case, the angle of view with respect to first image may be about 15° or greater or about 20° or greater. However, since the lenses LN16 and LN26 may be arranged to face the ocular organ 10, a degree of freedom for design may be enhanced. Furthermore, the chromatic dispersion/chromatic aberration problem may be prevented or reduced. The configuration from the first polarization-dependent lens LN16 to the first linear polarizer LP16, or the configuration from the fourth QWP WP46 to the first linear polarizer LP16, may be made to be relatively compact.

In the example embodiments of FIGS. 12, 13, 14, and 15, the first polarization-dependent lens LN16 and the second polarization-dependent lens LN26 may have optically opposite directionalities, which is described below with reference to FIG. 16.

Figure 16:
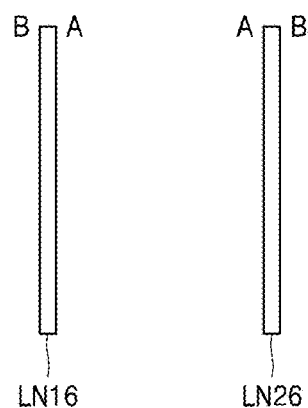
FIG. 16 is a drawing for explaining the directionality of a plurality of polarization-dependent lenses which are applicable to a display apparatus, according to another example embodiment.

Referring to FIG. 16, the first polarization-dependent lens LN16 and the second polarization-dependent lens LN26 may have the optically same characteristic. The first polarization-dependent lens LN16 and the second polarization-dependent lens LN26 may be optically equivalent lenses. However, the positions of the first surface A and the second surface B of the first polarization-dependent lens LN16 may be opposite to the positions of the first surface A and the second surface B of the second polarization-dependent lens LN26. As illustrated in FIG. 16, when the first and second polarization-dependent lenses LN16 and LN26 have the opposite directionalities, the characteristics described with reference to FIGS. 12, 13, 14, and 15 may appear. However, in some cases, in FIGS. 12, 13, 14, and 15, the first and second polarization-dependent lenses LN16 and LN26 may be configured to have the same directionality. In this case, the configurations, positions, or number of the wave plate and/or the polarizer may be changed.

Figure 17:
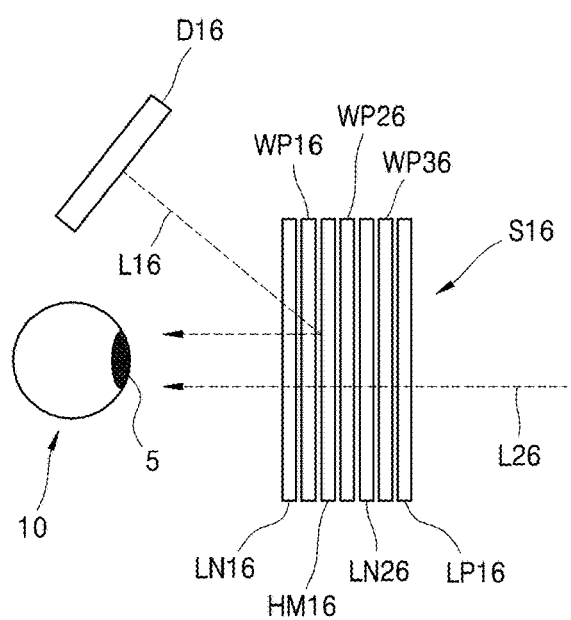
FIG. 17 illustrates a configuration of a display apparatus, according to another example embodiment.

Although in the example embodiments of FIGS. 12, 13, 14, and 15 the elements (WP46, LN16, WP16, HM16, WP26, LN26, WP36, and LP16) arranged before the ocular organ 10 of the user are illustrated to be quite spaced apart from one another, actually, the elements may be relatively closely arranged or in contact with one another, and an example thereof is illustrated in FIG. 17.

Referring to FIG. 17, the first polarization-dependent lens LN16, the first QWP WP16, the half mirror HM16, the second QWP WP26, the second polarization-dependent lens LN26, the third QWP WP36, and the first linear polarizer LP16 may be arranged to be relatively close to one another, or at least some of the elements may be in contact with one another. The elements (i.e., LN16, WP16, HM16, WP26, LN26, WP36, and LP16) may be said to form a single optical system S16. Each of the polarization-dependent lenses LN16 and LN26 may have a thickness of several millimeters or less, for example, about 1 mm or less. The first QWP WP16, the second QWP WP26, the third QWP WP36, and the first linear polarizer LP16 each may have a film shape and may be formed to have a relatively thin thickness. The half mirror HM16 may have a film shape or may be a coating film, and may have a thin thickness. The optical system S16 may have a thickness of about 10 mm or less, for example, about 5 mm or less or about 3 mm or less. Accordingly, a compact configuration may be possible. In particular, in the case of FIG. 17, since a polarization beam splitter or a beam splitter is not used, the configuration may be further simplified to be compact. Accordingly, the weight and volume of the display apparatus may be reduced. However, the thickness of the optical system S16 is not limited to the above description and, in some cases, the optical system S16 may have a thickness of about 10 mm or more.

Figure 18:
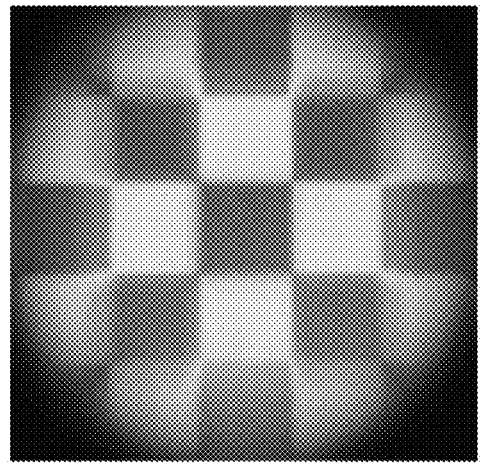
FIG. 18 is an experimental result showing a chromatic dispersion problem of a lens portion, according to a comparative example.

FIG. 18 is an experimental result showing a chromatic dispersion problem of a lens portion, according to a comparative example. The lens portion according to the comparative example has a configuration of one GP lens and one general refraction lens bonded to each other. An image of FIG. 18 shows how an outside image appears as viewed through the lens portion.

Referring to FIG. 18, it may be seen that, when the lens portion according to the comparative example is used, a relatively large amount of chromatic dispersion occurs. In this aspect, when a GP lens and a general refraction lens are bonded to each other, a significant amount of chromatic dispersion may occur. In particular, the chromatic dispersion problem may become more severe toward an edge of the image.

Figure 19:
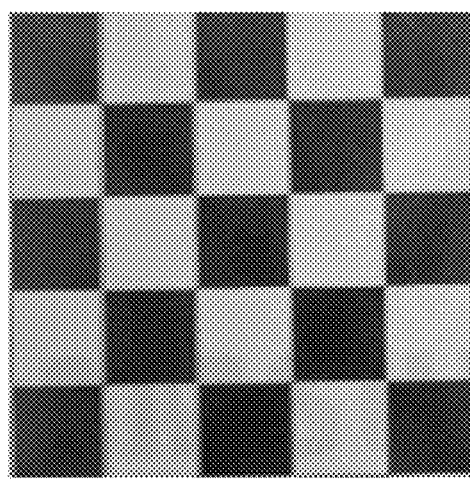
FIG. 19 is an experimental result showing a chromatic dispersion reduction effect of a lens system, according to an example embodiment.

FIG. 19 is an experimental result showing a chromatic dispersion reduction effect of a lens system, according to an example embodiment. A lens system according to the present example embodiment may include two polarization-dependent lenses. The two polarization-dependent lenses are GP lenses. The lens system may correspond to the lens system LT10 of FIGS. 2A and 2B or to the optical system S11 of FIG. 11 or and the optical system S16 of FIG. 17.

Referring to FIG. 19, it may be seen that, when the lens system according to the present example embodiment is used, the chromatic dispersion problem is greatly reduced. This is because the chromatic dispersion effects by the two polarization-dependent lenses are offset with each other. Accordingly, as the lens system according to the present example embodiment is used, the chromatic dispersion problem may be prevented or reduced.

In the example embodiments of FIGS. 7, 8, and 9, FIGS. 11 and 12, and FIG. 17, the angle of view with respect to the first image, that is, the display image, may be about 40° or greater. The angle of view with respect to the first image may be about 60° or greater or about 100° or greater. In the example embodiments of FIGS. 13, 14, and 15 15, the angle of view with respect to the first image, that is, the display image, may be about 15° or greater or about 20° or greater. Accordingly, in the entirety of the example embodiments, the angle of view with respect to the first image, that is, the display image, may be about 15° or greater and, in some cases, about 40° or greater.

Figure 20:
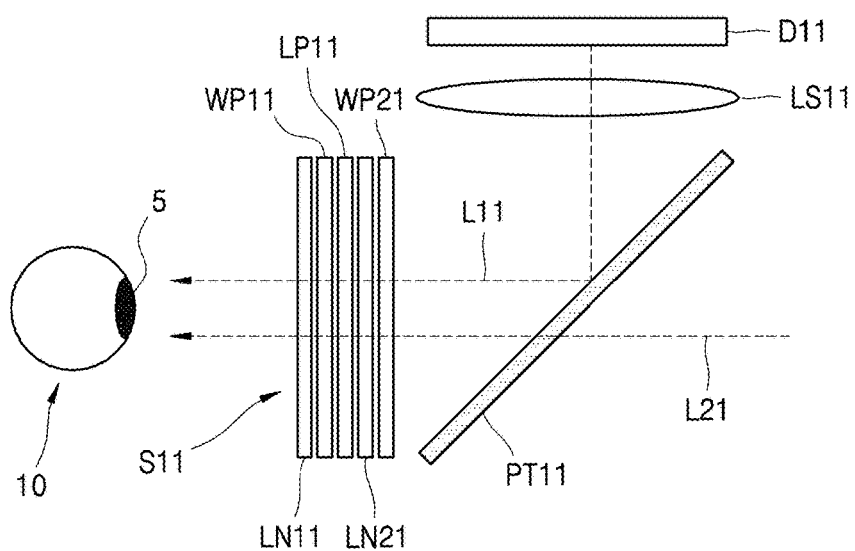
FIG. 20 illustrates a configuration of a display apparatus, according to another example embodiment.

In the example embodiments of FIGS. 1 to 3, FIGS. 7 to 9, FIGS. 11 to 15, and FIG. 17, at least one lens (additional lens) may be further be provided in front of or in the rear of the image forming devices D10, D11, and D16, and an example thereof is illustrated in FIG. 20.

FIG. 20 illustrates a case in which a lens LS11 is further provided in the configuration of FIG. 11. The lens LS11 may be arranged in the rear of the image forming device D11. Accordingly, the lens LS11 may be arranged between the image forming device D11 and the polarization beam splitter PT11. Although not illustrated, a light source unit may be further arranged in front of the image forming device D11 (upper side in the drawing). The lens LS11 may be an additional lens or an auxiliary lens. By using the additional lens LS11, a focal length of an overall optical system or a numerical aperture NA may be adjusted. Although FIG. 20 illustrates a case in which the lens LS11 is arranged in the rear of the image forming device D11, the lens LS11 may be arranged in front of the image forming device D11 (upper side in the drawing). In particular, the image forming device D11 may be arranged between the lens LS11 and the polarization beam splitter PT11. One or a plurality of lenses may be arranged at each of positions in front of and in the rear of the image forming device D11. The shape of the additional lens LS11 illustrated in FIG. 20 is merely exemplary and may be changed in various ways. Furthermore, the lens LS11 may be a general lens, that is, a bulk lens, or a GP lens.

By using at least one additional lens LS11 as illustrated in FIG. 20, the chromatic dispersion/chromatic aberration problem with respect to the first image formed by the image forming device D11 may be prevented or reduced. In the optical system S11, the chromatic dispersion/chromatic aberration problem that may be generated with respect to the first image, that is, the light L11 that propagates along the first path, may be offset or reduced by using the additional lens LS11. For example, in the optical system S11, when chromatic dispersion occurs in a positive (+) direction chromatic dispersion with respect to the light L11 that propagates along the first path, the chromatic dispersion effect may be offset by allowing the chromatic dispersion to occur in a negative (−) direction with respect to the light L11 by using the additional lens LS11. To this end, a general lens or a GP lens may be used as the additional lens LS11. For the light L21 that propagates along the second path, the optical system S11 itself may prevent occurrence of a chromatic dispersion problem. It may be difficult to further provide an additional lens (general lens) that has a general shape with respect to the light L21 that propagates along the second path.

Figure 21:
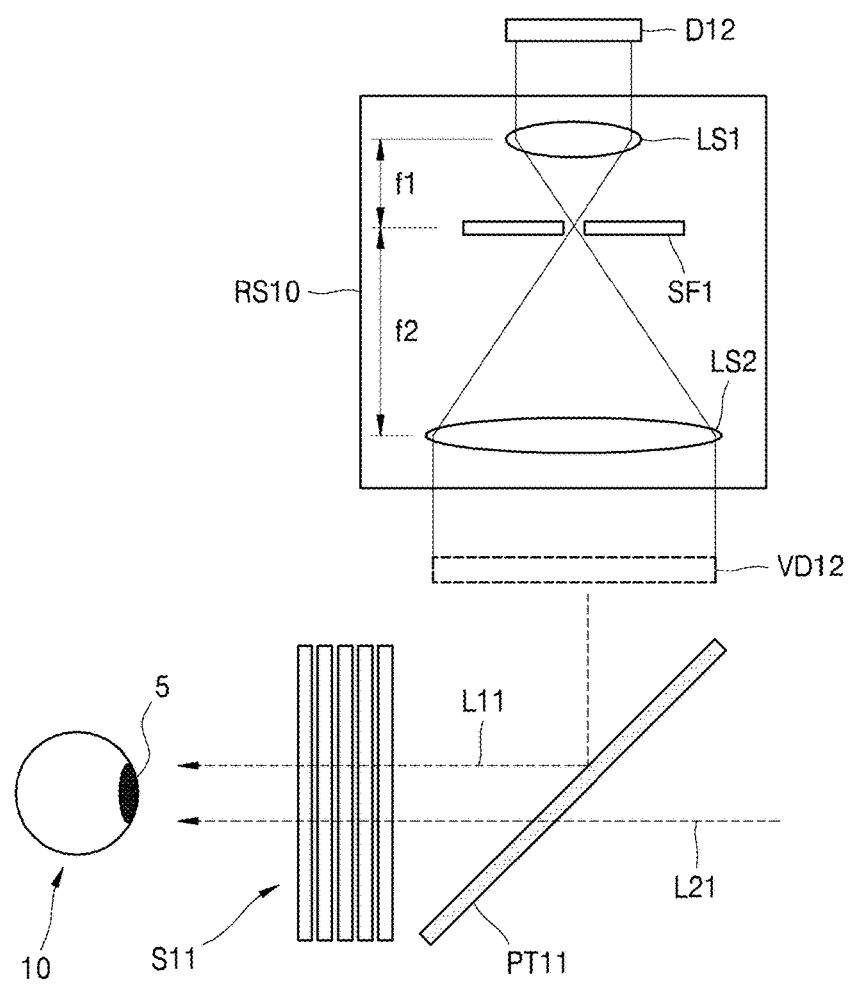
FIG. 21 illustrates a configuration of a display apparatus, according to another example embodiment.

FIG. 21 illustrates a configuration of a display apparatus, according to another example embodiment.

Referring to FIG. 21, the display apparatus of the present example embodiment may be configured to form a "virtual image" VD12 of an image forming device D12. For example, by using a certain relay optical system RS10, the virtual image VD12 of the image forming device D12 may be formed. In the following description, the virtual image VD12 of the image forming device D12 may be referred to as the "virtual image forming device" VD12. The virtual image forming device VD12 may be an "imaged SLM". The virtual image forming device VD12 may be formed in an area that is adjacent to the polarization beam splitter PT11.

A relay optical system RS10 may include, for example, a first relay lens LS1, a second relay lens LS2, and a spatial filter SF1 arranged between the first and second relay lenses LS1 and LS2. The first relay lens LS1 may have a first focal length f1, and the second relay lens LS2 may have a second focal length f2. The spatial filter SF1 may be located on or in close proximity to a focal plane of the first and second relay lenses LS1 and LS2. The spatial filter SF1 may have a certain aperture, such as a pinhole, and may remove noise from light that propagates through the first relay lens LS1.

The first focal length f1 of the first relay lens LS1 and the second focal length f2 of the second relay lens LS2 may be the same as each other or different from each other. The size of the virtual image forming device VD12 may vary based on relative sizes, that is, a ratio, of the first focal length f1 and the second focal length f2. For example, when the second focal length f2 is greater than the first focal length f1, the virtual image forming device VD12 may be larger than the image forming device D12 that is an actual device. When the first focal length f1 is greater than the second focal length f2, the virtual image forming device VD12 may be smaller than the image forming device D12 that is an actual device. Accordingly, by adjusting the first and second focal lengths f1 and f2, the size of the virtual image forming device VD12 may be controlled to a desired level. A user may see a display image obtained by using the virtual image forming device VD12. However, the configuration of the relay optical system RS10 is merely exemplary and may be changed in various ways. In an example, a path of light emitted from the relay optical system RS10 may be altered by using a certain reflection member (not shown). The virtual image forming device VD12 may be formed by the light reflected by the reflection member. In this case, an arrangement relation between the relay optical system RS10 and the polarization beam splitter PT11 may be altered from the arrangement relation illustrated in FIG. 21.

Figure 22:
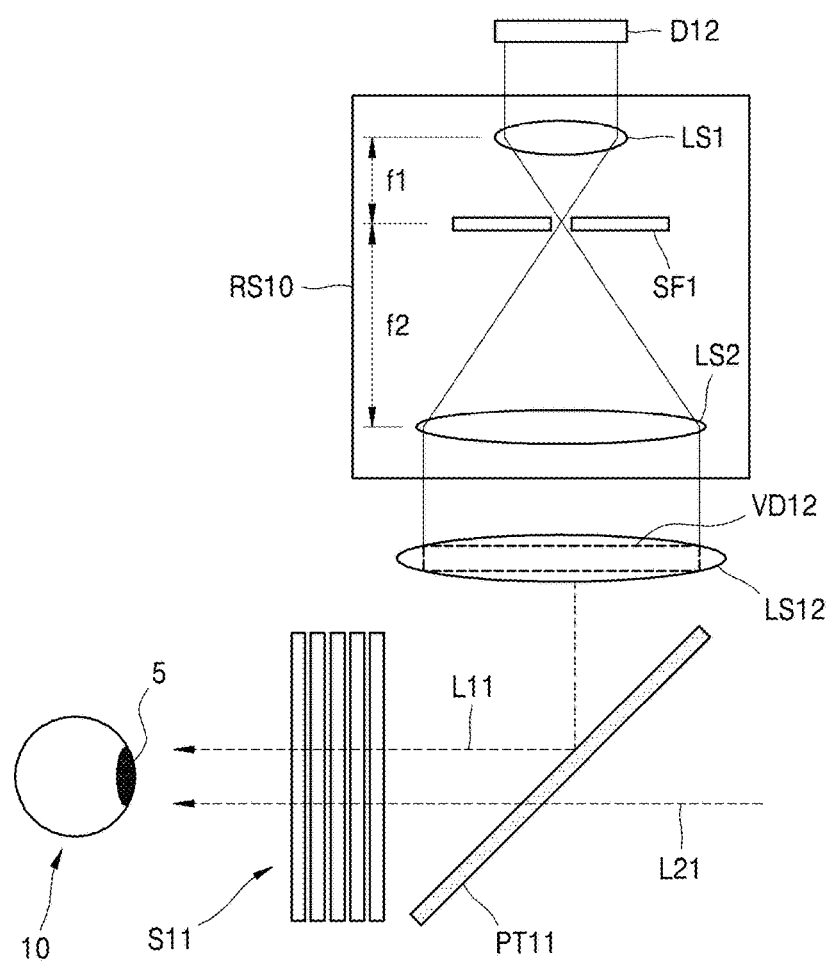
FIG. 22 illustrates a configuration of a display apparatus, according to another example embodiment.

According to another example embodiment, at least one additional lens may be further provided in the configuration of FIG. 21, and an example thereof is illustrated in FIG. 22.

Referring to FIG. 22, a lens LS12 may be further arranged between the relay optical system RS10 and the polarization beam splitter PT11. The virtual image forming device VD12 may be formed at the position of the lens LS12 or in an area that is adjacent to the lens LS12. Although FIG. 22 illustrates a case in which the virtual image forming device VD12 is formed at the lens LS12, the virtual image forming device VD12 may be formed in front of or in the rear of the lens LS12. By using the lens LS12 that is an additional lens, a focal length or a numerical aperture NA of the optical system may be adjusted. Furthermore, by using the lens LS12 that is an additional lens, the chromatic dispersion/chromatic aberration problem with respect to the light L11 that propagates along the first path may be prevented or reduced.

Figure 23:
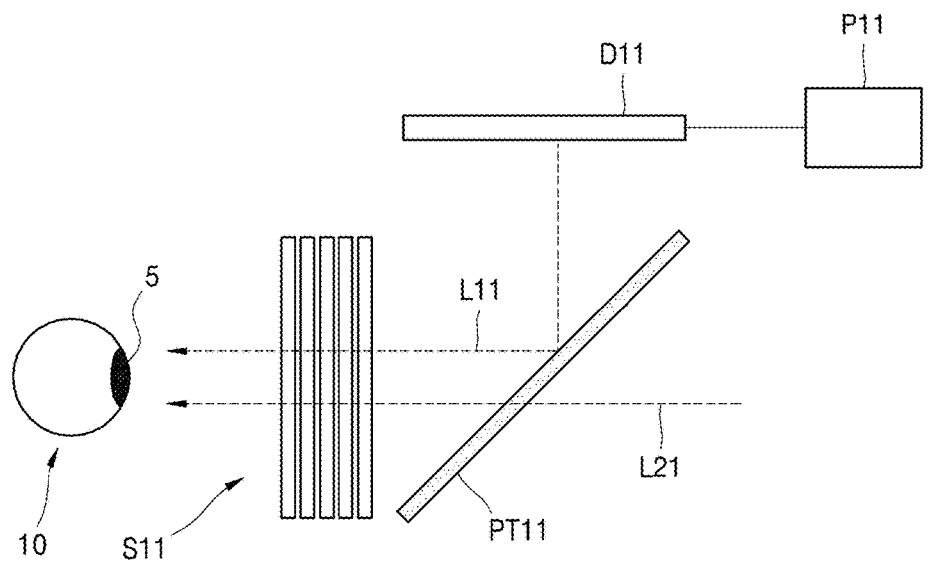
FIG. 23 illustrates a configuration of a display apparatus, according to another example embodiment.

In the example embodiments of FIGS. 1 to 3, FIGS. 7 to 9, FIGS. 11 to 15, and FIG. 17, an image signal processor connected to the image forming devices D10, D11, and D16 may be further provided, and an example thereof is illustrated in FIG. 23.

FIG. 23 illustrates a case in which an image signal processor P11 is further provided in the configuration of FIG. 11. The image signal processor P11 may be connected to the image forming device D11. The image signal processor P11 may be configured to reduce chromatic dispersion/chromatic aberration with respect to a first image, that is, an image that corresponds to the light L11 that propagates along the first path, in the optical system S11. For example, in the optical system S11, when red-green-blue (RGB) chromatic dispersion occurs in a forward direction with respect to the light L11 that propagates along the first path, the RGB is dispersed in a reverse direction by the image signal processor P11 in order to input an image signal to the image forming device D11, thereby offsetting the chromatic dispersion effect. In this regard, when a signal is input to the image forming device D11 by using the image signal processor P11, a method of enlarging/contracting, that is, rescaling, an image for each color of the RGB may be used. Alternatively, when a signal is input to the image forming device D11 by using the image signal processor P11, a method of relatively moving, that is, shifting, an image for each color of the RGB may be used. Furthermore, the image signal processor P11 may be configured to perform all signal processing functions of a general display apparatus. Although not illustrated in FIG. 23, at least one additional lens may be provided at least one of a position in front of and a position in the rear of the image forming device D11.

Figure 24:
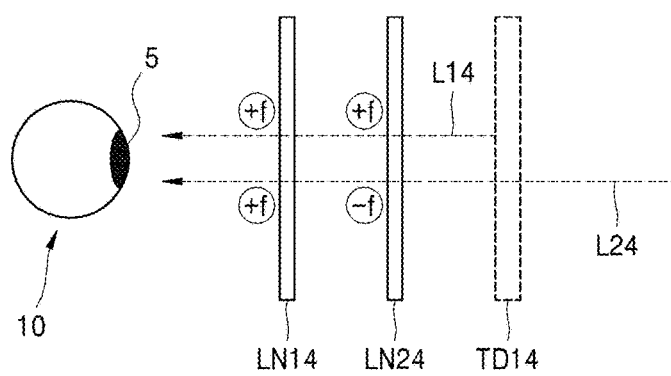
FIG. 24 illustrates a configuration of a display apparatus, according to another example embodiment.

FIG. 24 illustrates a configuration of a display apparatus, according to another example embodiment.

Referring to FIG. 24, the display apparatus according to the present example embodiment may include a transparent image forming device (or translucent image forming device) TD14 for forming a first image. The transparent image forming device TD14 may be a device that is configured for forming an image and may also have characteristics of transmitting light. In this case, the transparent image forming device TD14 may be arranged between the ocular organ 10 of the user and an outside foreground that the user faces. The transparent image forming device TD14 may include, for example, a light-emitting diode (LED) display device and/or an organic LED (OLED) display device. The transparent image forming device TD14 may be a self-luminous device. Furthermore, the transparent image forming device TD14 may be configured to emit light that is polarized in a particular direction. To this end, the transparent image forming device TD14 may include a certain polarization layer or a polarization element.

The display apparatus may include at least two polarization-dependent lenses LN14 and LN24 arranged between the ocular organ 10 and the transparent image forming device TD14. For example, the display apparatus may include the first and second polarization-dependent lenses LN14 and LN24. The second polarization-dependent lens LN24 may be arranged between the first polarization-dependent lens LN14 and the transparent image forming device TD14.

Light L14 generated by the transparent image forming device TD14 may be referred to as the light L14 that propagates along the first path, and light L24 transmitting through the transparent image forming device TD14 from the outside of the transparent image forming device TD14 may be referred to as the light L24 that propagates along the second path. Since the light L14 that propagates along the first path and the light L24 that propagates along the second path have similar propagation directions, but different generation positions and different overall paths, the light L14 that propagates along the first path and the light L24 that propagates along the second path may be said to have different paths.

Each of the first and second polarization-dependent lenses LN14 and LN24 may have a positive (+) focal length with respect to the light L14 that propagates along the first path. One of the first and second polarization-dependent lenses LN14 and LN24 may have a positive (+) focal length with respect to the light L24 that propagates along the second path and the other may have a negative (−) focal length with respect to the light L24 that propagates along the second path. Accordingly, a combination of the first and second polarization-dependent lenses LN14 and LN24 may reinforce refractive power with respect to the light L14 that propagates along the first path and offset the refractive power with respect to the light L24 that propagates along the second path. Accordingly, a wide angle of view may be secured with respect to the first image that corresponds to the light L14 that propagates along the first path, and a distortion problem may be prevented with respect to the second image that corresponds to the light L24 that propagates along the second path.

In addition, when the transparent image forming device TD14 is used as in the present example embodiment, the configuration of a multi-image transmitting optical system (see-through type optical system) may be simplified and thus the display apparatus may be miniaturized. Accordingly, a display apparatus having a compact configuration may be implemented. Although not illustrated, at least one wave plate and/or at least one polarizer may be further arranged between the first polarization-dependent lens LN14 and the transparent image forming device TD14 or outside the first polarization-dependent lens LN14 and the transparent image forming device TD14. The configurations and functions of the wave plate and the polarizer may be similar to those described with reference to FIGS. 7,8 and 9 or FIGS. 12, 13, 14, and 15.

Figure 25:
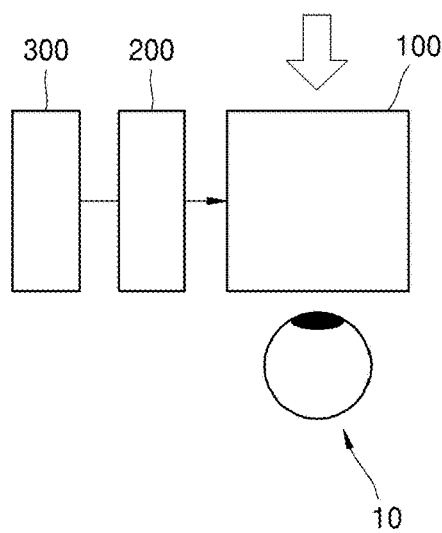
FIG. 25 is a schematic block diagram illustrating an overall configuration/system of a display apparatus, according to an example embodiment.

FIG. 25 is a schematic block diagram illustrating an overall configuration/system of a display apparatus, according to an example embodiment.

Referring to FIG. 25, a see-through type optical system 100 may be provided. An image forming unit 200 for supplying a certain display image to the see-through type optical system 100 may be provided. The image forming unit 200 may include an image forming device (also referred to herein as an "image generator") and a light source unit. Furthermore, a controller 300 connected to the image forming unit 200 may be provided. The see-through type optical system 100 may be oriented such that the ocular organ 10 of the user is arranged to face the see-through type optical system 100.

The see-through type optical system 100 may include the above-described multipath optical member (ex, M10 or M15) and at least two polarization-dependent lenses (ex, LN10, LN20, LN15, or LN25). The image forming unit 200 may include the above-described image forming device (ex, D10, or D15). If needed, the image forming unit 200 may include the relay optical system RS10. The image forming unit 200 may further include a certain light source unit. The light source unit may include, for example, a light source and a collimator lens. The controller 300 may be connected to the image forming unit 200 and configured to control the elements of the image forming unit 200. The controller 300 may further include a processor, such as a central processing unit (CPU). Although not illustrated, the display apparatus of FIG. 25 may further include an input unit (also referred to herein as an "input device") and output unit (also referred to herein as an "output device") for a user interface.

Figure 26:
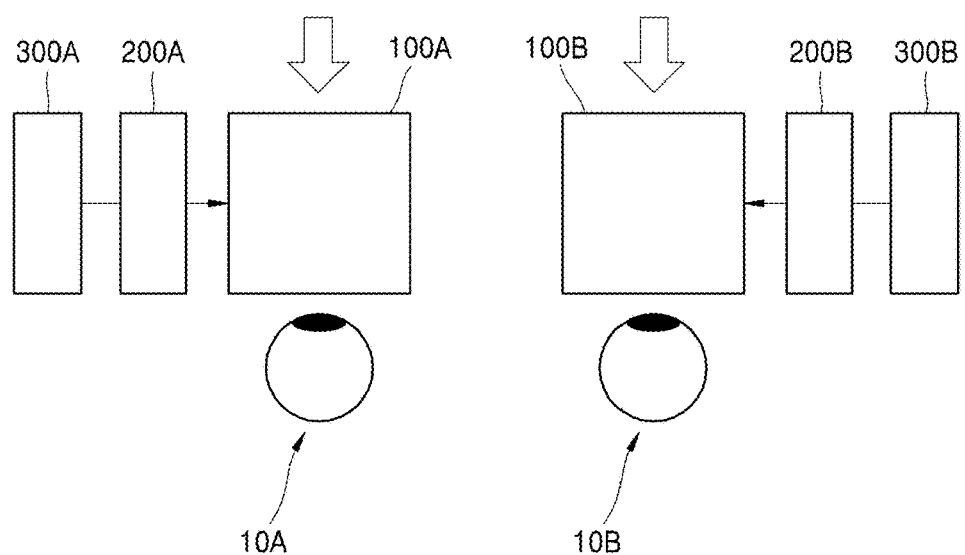
FIG. 26 is a schematic block diagram illustrating an overall configuration/system of a display apparatus, according to another example embodiment.

The configuration of FIG. 25 may be provided as a pair that has left-right symmetry, and an example thereof is illustrated in FIG. 26.

Referring to FIG. 26, a first see-through type optical system 100A, and a first image forming unit 200A and a first controller 300A that correspond to the first see-through type optical system 100A, may be provided. A second see-through type optical system 100B may be arranged to be spaced apart from the first see-through type optical system 100A, and a second image forming unit 200B and a second controller 300B that correspond to the second see-through type optical system 100B may be provided. The first see-through type optical system 100A may be arranged to correspond to a first ocular organ 10A of a user, and the second see-through type optical system 100B may be arranged to correspond to a second ocular organ 10B of a user. The first ocular organ 10A may be a user's left eye, and the second ocular organ 10B may be a user's right eye. Accordingly, the configuration of FIG. 26 may be applied to a binocular display apparatus.

Figure 27:
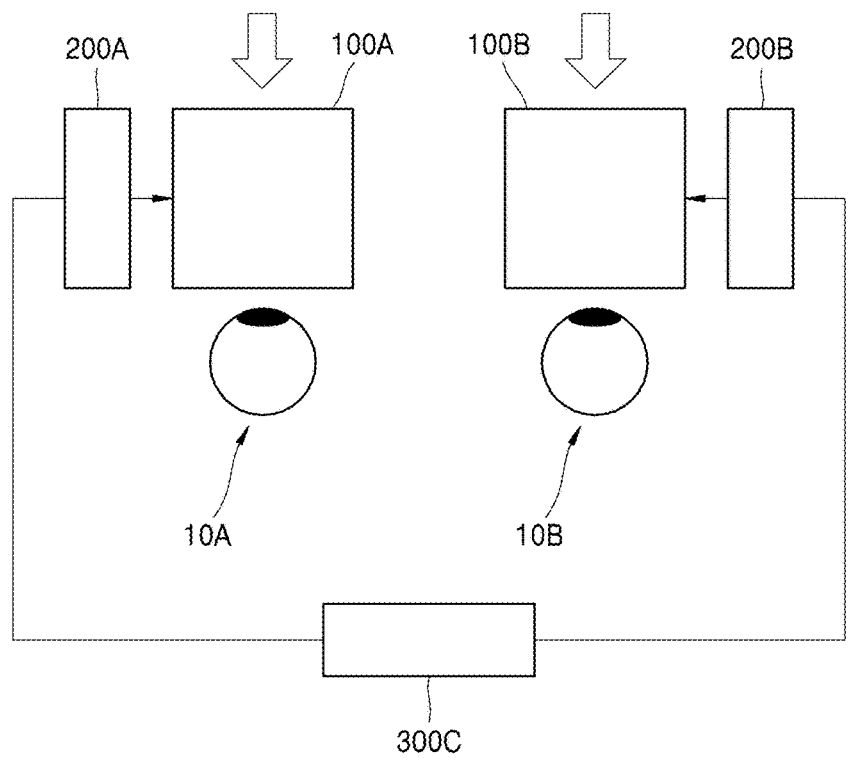
FIG. 27 is a schematic block diagram illustrating an overall configuration/system of a display apparatus, according to another example embodiment.

In FIG. 26, the first controller 300A and the second controller 300B may be incorporated in one controller, instead of being separately provided, and an example thereof is illustrated in FIG. 27. Referring to FIG. 27, the first and second image forming units 200A and 200B may be connected to one controller 300C. Furthermore, in some cases, the controller 300C may be connected to the image forming units 200A and 200B in a wireless manner, as opposed to a wired manner.

Figure 28:
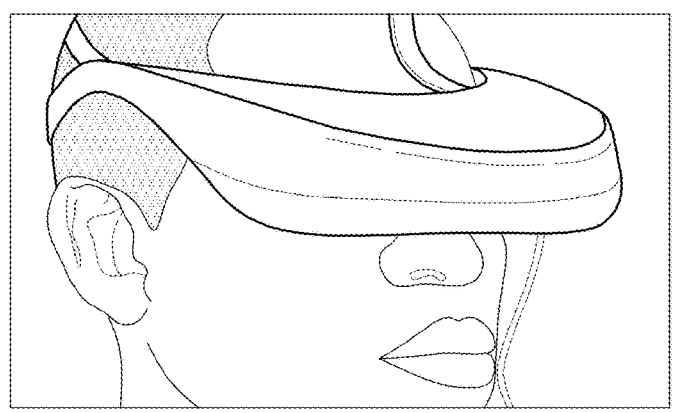
FIGS. 28, 29, and 30 illustrate various electronic apparatuses to which display apparatuses according to example embodiments may be applicable.
Figure 29:
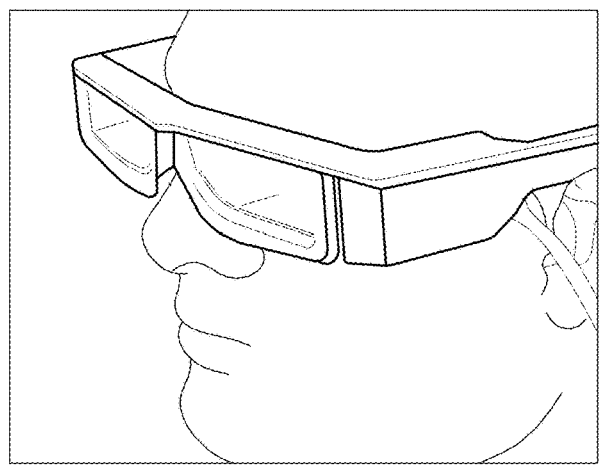
Figure 30:
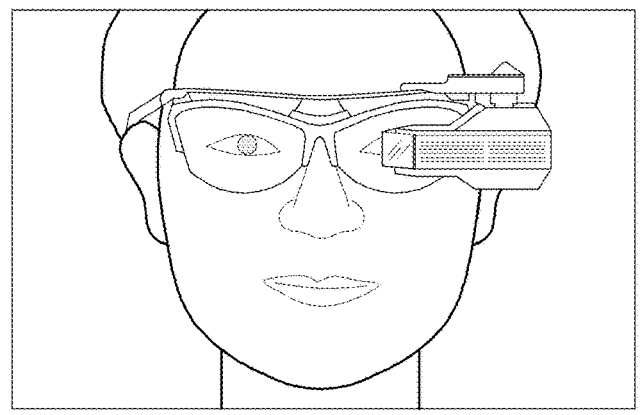

At least a part of display apparatuses (multi-image/see-through type display apparatus) according to various example embodiments may constitute a wearable device. In particular, the display apparatus may be applied to a wearable device. As an example, the display apparatus may be applied to a head mounted display (HMD). Furthermore, the display apparatus may be applied to a glasses-type display or a goggle-type display. FIGS. 28, 29, and 30 illustrate various electronic apparatuses to which display apparatuses according to example embodiments are applicable. The electronic apparatuses of FIGS. 28, 29, and 30 are examples of an HMD or a glasses-type display. The wearable electronic devices of FIGS. 28, 29, and 30 may be operated by being configured to interact with or connected to a smartphone.

In addition, the display apparatuses according to various example embodiments may be provided in smart phones, and the smart phone may be used as the see-through type display apparatus. In this aspect, the see-through type display apparatus may be applied to compact electronic apparatuses or mobile electronic apparatuses, not to the wearable devices of FIGS. 28, 29, and 30. The application fields of the display apparatuses according to the above example embodiments may vary in various ways. Further, the display apparatuses according to the above example embodiments may be not only used to implement augmented reality (AR) or mixed reality (MR), but also applied to other fields. In particular, the technical concept of the present inventive concept may be applied not only to the AR or the MR, but also to multi-image displays capable of simultaneously displaying a plurality of images.

It should be understood that example embodiments described herein should be considered in a descriptive sense only and not for purposes of limitation. Descriptions of features or aspects within each example embodiment should typically be considered as available for other similar features or aspects in other example embodiments. For example, one of ordinary skill in the art could have seen that the configurations of the optical system (lens system) and the display apparatus comprising the same, which are described with reference to FIGS. 1 to 17 and FIGS. 20 to 24 may be modified in various ways. In a detailed example, the optical system (lens system) may include two or more polarization-dependent lenses, for example, four or more polarization-dependent lenses, a ½ wave plate (half-wave plate) may be used as the wave plate, and the configuration of the polarizer may be changed. Furthermore, the numbers, positions, and characteristics of the wave plate and the polarizer may be changed in various ways. Furthermore, a plurality of polarization-dependent lenses having different characteristics may be used, and a lens other than the GP lens may be used as the polarization-dependent lens. Furthermore, while one or more example embodiments have been described with reference to the figures, it will be understood by those of ordinary skill in the art that various changes in form and details may be made therein without departing from the spirit and scope as defined by the following claims.

What is claimed is:
1. A display apparatus comprising:
an image generator configured to generate a first image; and
a multi-image transmitting optical system configured to transfer the first image to an ocular organ of a user via a first path and to transfer a second image that is different from the first image to the ocular organ of the user via a second path that is different from the first path,
wherein the multi-image transmitting optical system comprises at least two polarization-dependent lenses,
each of the at least two polarization-dependent lenses has a respective focal length that varies based on a polarization state of incident light, and
a combination of the at least two polarization-dependent lenses has first optical characteristics with respect to the first image and second optical characteristics that are different from the first optical characteristics with respect to the second image.

2. The display apparatus of claim 1, wherein a combination of the at least two polarization-dependent lenses is configured to reinforce a refractive power with respect to the first image and to offset the refractive power with respect to the second image.

3. The display apparatus of claim 1, wherein a combination of the at least two polarization-dependent lens is configured to have a positive focal length with respect to the first image and to have an infinite or substantially infinite focal length with respect to the second image.

4. The display apparatus of claim 1, wherein the at least two polarization-dependent lens comprise a first polarization-dependent lens and a second polarization-dependent lens,
light that corresponds to the first image passes through each of the first polarization-dependent lens and the second polarization-dependent lens, and each of the first polarization-dependent lens and the second polarization-dependent lens has a positive focal length with respect to the light that corresponds to the first image.

5. The display apparatus of claim 1, wherein the at least two polarization-dependent lenses comprise a first polarization-dependent lens and a second polarization-dependent lens,
light that corresponds to the first image twice passes through one from among the first polarization-dependent lens and the second polarization-dependent lens, and
the one from among the first polarization-dependent lens and the second polarization-dependent lens through which the light that corresponds to the first image passes twice, has a positive focal length with respect to the light of the first image during each of a first pass and a second pass.

6. The display apparatus of claim 1, wherein the at least two polarization-dependent lenses comprise a first polarization-dependent lens and a second polarization-dependent lens,
light that corresponds to the second image passes through each of the first polarization-dependent lens and the second polarization-dependent lens, and
one from among the first polarization-dependent lens and the second polarization-dependent lens has a positive focal length with respect to the light that corresponds to the second image, and the other from among the first polarization-dependent lens and the second polarization-dependent lens has a negative focal length with respect to the light that corresponds to the second image.

7. The display apparatus of claim 1, wherein each of the at least two polarization-dependent lenses is a geometric phase lens.

8. The display apparatus of claim 1, wherein the multi-image transmitting optical system is a see-through type optical system, and
the second image is an external image that is visible to the user through the multi-image transmitting optical system.

9. The display apparatus of claim 1, wherein the multi-image transmitting optical system comprises:
a multipath optical member;
the at least two polarization-dependent lenses arranged between the multipath optical member and the ocular organ of the user; and
at least one from among at least one polarizer and at least one wave plate arranged between two from among the at least two polarization-dependent lenses or outside the at least two polarization-dependent lenses.

10. The display apparatus of claim 9, wherein the multi-image transmitting optical system comprises:
a first polarization-dependent lens arranged between the multipath optical member and the ocular organ;
a second polarization-dependent lens arranged between the first polarization-dependent lens and the multipath optical member;
a first linear polarizer arranged between the first polarization-dependent lens and the second polarization-dependent lens; and
a first quarter-wave plate (QWP) arranged between the first polarization-dependent lens and the first linear polarizer.

11. The display apparatus of claim 10, wherein the multipath optical member comprises a polarization beam splitter, and
the multi-image transmitting optical system further comprises a second QWP that is arranged between the second polarization-dependent lens and the multipath optical member.

12. The display apparatus of claim 10, wherein the multipath optical member comprises one from among a beam splitter and a transflective film, and
the multi-image transmitting optical system further comprises a second QWP and a second linear polarizer that are sequentially arranged at a side of an incident surface of the multipath optical member.

13. The display apparatus of claim 10, wherein the multipath optical member comprises one from among a beam splitter and a transflective film, and
the multi-image transmitting optical system further comprises:
a second QWP that is arranged between the second polarization-dependent lens and the multipath optical member;
a second linear polarizer arranged at a side of a first incident surface of the multipath optical member; and
a third linear polarizer arranged at a side of a second incident surface of the multipath optical member.

14. The display apparatus of claim 9, wherein each of the first polarization-dependent lens and the second polarization-dependent lens has an optically same directionality.

15. The display apparatus of claim 1, wherein the multi-image transmitting optical system comprises:
a first polarization-dependent lens and a second polarization-dependent lens sequentially arranged to face the ocular organ;
a half mirror arranged between the first polarization-dependent lens and the second polarization-dependent lens; and
at least one from among at least one polarizer and at least one wave plate arranged between the half mirror and at least one from among the first polarization-dependent lens and the second polarization-dependent lens or outside the at least two polarization-dependent lenses.

16. The display apparatus of claim 15, wherein the multi-image transmitting optical system comprises:
a first quarter-wave plate (QWP) arranged between the first polarization-dependent lens and the half mirror;
a second QWP arranged between the half mirror and the second polarization-dependent lens;
a first linear polarizer spaced apart from the second polarization-dependent lens; and
a third QWP arranged between the second polarization-dependent lens and the first linear polarizer.

17. The display apparatus of claim 16, wherein the multi-image transmitting optical system further comprises one from among a beam splitter and a transflective film arranged between the ocular organ of the user and the first polarization-dependent lens.

18. The display apparatus of claim 16, wherein the multi-image transmitting optical system further comprises:
a polarization beam splitter (PBS) arranged between the ocular organ of the user and the first polarization-dependent lens; and
a fourth QWP arranged between the polarization beam splitter and the first polarization-dependent lens.

19. The display apparatus of claim 15, wherein the first polarization-dependent lens has a first optical directionality and the second polarization-dependent lens has a second optical directionality that is opposite the first optical directionality.

20. The display apparatus of claim 1, wherein the image generator comprises a spatial light modulator (SLM).

21. The display apparatus of claim 1, further comprising at least one additional lens that is arranged in front of or in a rear of the image generator.

22. The display apparatus of claim 21, wherein the at least one additional lens is configured to reduce chromatic dispersion with respect to the first image in the multi-image transmitting optical system.

23. The display apparatus of claim 1, further comprising an image signal processor that is connected to the image generator,
wherein the image signal processor is configured to reduce chromatic dispersion with respect to the first image in the multi-image transmitting optical system.

24. The display apparatus of claim 1, wherein the display apparatus has an angle of view greater than or equal to 15°.

25. The display apparatus of claim 1, wherein the display apparatus is configured to implement at least one from among an augmented reality and a mixed reality.

26. The display apparatus of claim 1, further comprising a head mounted display.

27. The display apparatus of claim 1, further comprising at least one from among a glasses-type display and a goggle-type display.

28. A display apparatus comprising:
an image generator configured to generate a first image; and
a see-through type optical system configured to transfer the first image and a second image that is different from the first image to an ocular organ of a user,
wherein the see-through type optical system comprises a first polarization-dependent lens and a second polarization-dependent lens, each of the first polarization-dependent lens and the second polarization-dependent lens having a respective focal length that varies based on a polarization direction of incident light, and
each of the first polarization-dependent lens and the second polarization-dependent lens has a positive focal length with respect to the first image or light that corresponds to the first image passes twice through one from among the first polarization-dependent lens and the second polarization-dependent lens that has a positive focal length with respect to the first image, and
one from among the first polarization-dependent lens and the second polarization-dependent lens has a positive focal length with respect to the second image and the other from among the first polarization-dependent lens and the second polarization-dependent lens has a negative focal length with respect to the second image.

29. The display apparatus of claim 28, wherein the see-through type optical system further comprises:
a multipath optical member;
the first polarization-dependent lens and the second polarization-dependent lens which are arranged between the multipath optical member and the ocular organ of the user; and
at least one from among at least one polarizer and at least one wave plate arranged between the first polarization-dependent lens and the second polarization-dependent lens or outside both of the first polarization-dependent lens and the second polarization-dependent lens.

30. The display apparatus of claim 28, wherein the see-through type optical system further comprises:
a transflective member arranged between the first polarization-dependent lens and the second polarization-dependent lens; and
at least one from among at least one polarizer and at least one wave plate arranged between the transflective member and one from among the first polarization-dependent lens and the second polarization-dependent lens or outside the transflective member and both of the first polarization-dependent lens and the second polarization-dependent lens.

31. A display apparatus comprising:
a transflective member configured to reflect first light that propagates via a first path and to enable second light that propagates via a second path to propagate through the transflective member; and
a plurality of polarization-dependent lenses that includes a first polarization-dependent lens and at least a second polarization-dependent lens,
wherein the first polarization-dependent lens has a first focal length that varies based on a polarization state of incident light, and the first focal length is positive for each of the first path and the second path, and
wherein the second polarization dependent lens has a second focal length that varies based on the polarization state of the incident light, and whether the second focal length is positive or negative varies based on an incidence point of the incident light such that the second focal length is positive for the first path and negative for the second path, and
wherein when the first light is perceived by an eye of a user, a first image appears to the user, and when the second light is perceived by the eye of the user, a second image appears to the user.

32. The display apparatus of claim 31, wherein each of the plurality of polarization-dependent lenses is a geometric phase lens.

33. The display apparatus of claim 31, further comprising:
a first linear polarizer arranged between the first polarization-dependent lens and the second polarization-dependent lens; and
a first quarter-wave plate (QWP) arranged between the first polarization-dependent lens and the first linear polarizer.

34. The display apparatus of claim 33, wherein the transflective member comprises a polarization beam splitter (PBS), and
the display apparatus further comprises a second QWP that is arranged between the second polarization-dependent lens and the PBS.

35. The display apparatus of claim 31, wherein the transflective member comprises one from among a beam splitter and a transflective film, and
the display apparatus further comprises:
a second QWP that is arranged between the second polarization-dependent lens and the one from among the beam splitter and the transflective film;
a second linear polarizer arranged at a side of a first incident surface of the one from among the beam splitter and the transflective film; and
a third linear polarizer arranged at a side of a second incident surface of the one from among the beam splitter and the transflective film.

36. The display apparatus of claim 31, further comprising:
a half mirror arranged between the first polarization-dependent lens and the second polarization-dependent lens; and at least one from among at least one polarizer and at least one wave plate arranged between the half mirror and at least one from among the first polarization-dependent lens and the second polarization-dependent lens or outside the plurality of polarization-dependent lenses.

* * * * *